(12) United States Patent
Nguyen

(10) Patent No.: US 10,033,220 B1
(45) Date of Patent: Jul. 24, 2018

(54) HIGH-VOLTAGE ENERGY STORAGE SYSTEM

(71) Applicant: Amazon Technologies, Inc., Reno, NV (US)

(72) Inventor: Huyen Van Nguyen, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 935 days.

(21) Appl. No.: 14/463,476

(22) Filed: Aug. 19, 2014

(51) Int. Cl.
*H02J 9/06* (2006.01)
*H01F 38/00* (2006.01)

(52) U.S. Cl.
CPC ............... *H02J 9/06* (2013.01); *H01F 38/00* (2013.01); *H02J 2009/068* (2013.01)

(58) Field of Classification Search
None
See application file for complete search history.

(56) References Cited

U.S. PATENT DOCUMENTS

| | | | |
|---|---|---|---|
| 6,191,500 B1 * | 2/2001 | Toy | H02J 3/46 307/64 |
| 2009/0021078 A1 * | 1/2009 | Corhodzic | G06F 1/263 307/67 |

OTHER PUBLICATIONS

U.S. Appl. No. 14/020,499, filed Sep. 6, 2013, Huyen Van Nguyen.
U.S. Appl. No. 14/449,032, filed Jul. 31, 2014, Huyen Van Nguyen.
Passmore, Brandon, "Design and Development of a Low Cost, Manufacturable High Voltage Power Module for Energy Storage Systems—Phase I SBIR", Sep. 27, 2012, pp. 1-14., Arkansas Power Electronics International, Fayetteville, AR.
"Understanding Electric Demand", National Grid, Dec. 2005, pp. 1-4, Syracruse, NY.
Spears, Ed, "Parallel UPS configurations—Connecting multiple UPS modules for added capacity or redundancy", Jan. 2009, pp. 1-10, Eaton Corporation.
"Understanding Demand and Consumption", Duke Energy, http://www.think-energy.net/KWvsKWH.htm, pp. 1-8, [Retrieved Jul. 10, 2014].

(Continued)

*Primary Examiner* — Thienvu Tran
*Assistant Examiner* — David M Stables
(74) *Attorney, Agent, or Firm* — Robert C. Kowert; Meyertons, Hood, Kivlin, Kowert & Goetzel, P.C.

(57) ABSTRACT

A high-voltage energy storage system (ESS) device is coupled to a feed from a utility power source to a transformer that steps down high-voltage power and feeds one or more loads in a data center. The high-voltage ESS device can store electrical power from the utility power source and discharge stored electrical power. An energy control system monitors waveforms associated with utility power sources and determines whether a waveform indicates a potential loss of electrical power. The energy control system also monitors costs of receiving electrical power from utility power sources and determines whether the costs associated with receiving utility power from particular utility power sources exceed one or more thresholds. The energy control system can command a switching device assembly to selectively route high-voltage power from a utility power source or from the high-voltage ESS device to the transformer based on a waveform determination or a cost reduction determination.

20 Claims, 12 Drawing Sheets

(56) References Cited

OTHER PUBLICATIONS

M. Wang, et al "Real-Time Power Quality Waveform Recognition with a Programmable Digital Signal Processor", Department of Electrical Engineering, University of Washington, Jun. 3, 2010, pp. 1-7.
"Energy Storage Modules, Developing a Smarter Grid Using Battery Energy Storage Systmes", ABB Inc., May 31, 2012, pp. 1-37.
"Energy Storage Modules (ESM), Up to 4 MW Output Voltage Range of 120 Volts to 40.5 KV". ABB Inc., Apr. 2012, pp. 1-20.
"EssPro Energy Storage Power Conversion System (PCS) the Power to Control Energy", ABB Inc., 2014, pp. 1-12.
"EssPro Energy Storage Grid Substation the Power to Control Energy", ABB Inc., 2014—pp. 1-8.

* cited by examiner

HIGH-VOLTAGE ENERGY STORAGE SYSTEM

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage. A network of cabling, bus bars, power connectors, and power distribution units, is used to deliver the power at the lower voltage to numerous specific components in the facility.

A computing facility may receive one or more power feeds from one or more external power sources. For example, a power feed may originate from a utility power source. The power feed originating from a utility power source may be passed along power transmission lines at a high voltage (e.g., 115 kilovolts) to an electrical substation, which may include a transformer that can step down the power feed voltage to a lower voltage and supply the power feed to the computing facility. Power feeds may be stepped down by a substation transformer to a low voltage (e.g., 480 volts) or a medium voltage that is distributed to additional transformers to be stepped down further to a low voltage.

From time to time, a power feed from an external power source may experience disturbances that may interrupt normal receipt of power at the computing facility. For example, a lightning strike may cause a brief fluctuation in the power feed received at the facility. In another example, the power feed may become unstable such that it becomes unusable by the facility. In another example, an unexpected fluctuation in a power feed may damage downstream electrical equipment. In a further example, a power feed may fail altogether.

In many cases, a computing facility may include a low-voltage backup power source that can temporarily supply backup power to the facility in the event that a power feed from an external power source is lost. For example, a facility may include a generator powered by a diesel engine, where the generator is activated if the primary utility power feed is lost. A computing facility can include an uninterruptible power source (UPS), such as a battery, which can provide an uninterruptible supply of power for a short period of time.

A backup generator can require time to be activated and readied to supply backup power, which may present difficulties for a facility where even a brief interruption of power can damage equipment or otherwise interrupt normal operations. Furthermore, a backup generator may be expensive to operate. For example, a diesel-fueled backup generator may consume significant amounts of diesel fuel over a period of time, and the generator may require additional maintenance to maintain a reliable backup capability In many cases, a computing facility may be charged a variable rate by utility providers for electric power provided to the facility. For example, a price per kilowatt-hour of electricity consumed at a computing facility may vary throughout a day or throughout a year based on overall market demand such that the computing facility pays significantly higher costs per kilowatt-hour of electricity consumed during peak times of day or seasons of the year. Also, in many cases utility providers may charge a computing facility a demand charge based on peak flows of electrical power to the computing facility. For example, a demand charge may be based on the highest recorded electrical flow in kilowatts occurring during 15-minute increments throughout a day. A computing facility may be charged both demand charges for the highest flows during a day (kilowatts) and may be charged for consumption (kilowatt-hours).

Figure 1:
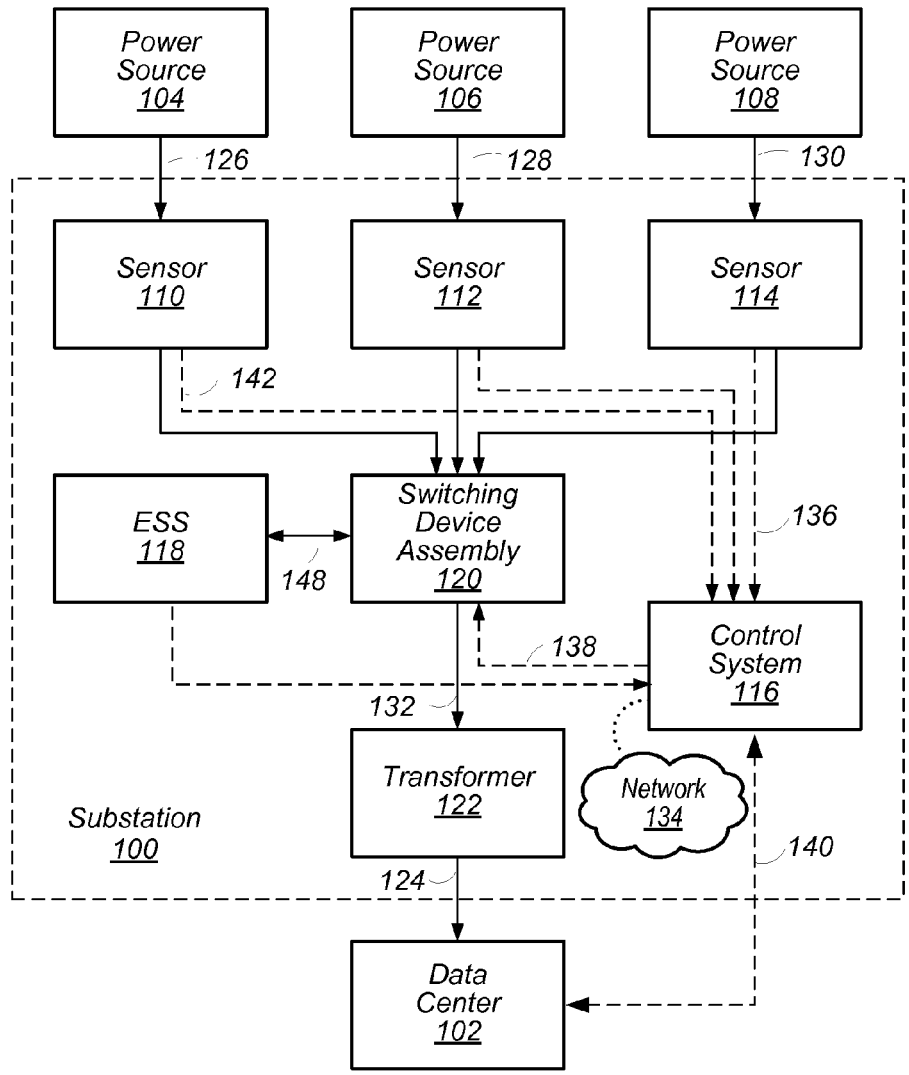
FIG. 1 is a block diagram illustrating a substation feeding electrical power to loads in a data center, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a high-voltage energy storage system (ESS), which provides a power feed to one or more power systems in a data center via a transformer are disclosed. According to one embodiment, a system includes a data center, an electrical substation configured to distribute low-voltage power to the data center from one or more utility power sources, and an energy control system. The electrical substation comprises a transformer configured to step down high-voltage power into low-voltage power supplied to the data center, at least one switching device assembly configured to route a high-voltage utility power feed to the transformer from one of a plurality of utility power sources and an ESS device. For example, the switching assembly may switch from routing a high-voltage utility power feed to the transformer between separate utility power sources or may switch routing a high-voltage utility power feed to the transformer between a utility power source and the ESS device. The ESS device is configured to selectively store high-voltage power received from a utility power source via a power connection and to discharge the stored high-voltage power, as a high-voltage discharge power feed, via the same power connection. For example, the ESS device may be charged with high-voltage power received from a utility power source supplying electrical power to the transformer and in the event of a loss of feed from the utility power source discharge stored electrical power as a high-voltage power feed to the transformer so that the flow of high-voltage power to the transformer is not interrupted by the loss of the utility power feed. The energy control system may be configured to command the at least one switching device to switch between routing a high-voltage utility power feed to the transformer or routing a separate high-voltage discharge power feed from the ESS device based on a waveform monitoring determination or a cost reduction monitoring determination. The waveform monitoring determination may include identifying a waveform pattern associated with the high-voltage utility power feed and determining that the identified waveform correlates with a waveform pattern indicating potential interruption of the high-voltage utility power feed. For example, the waveform pattern may correlate waveform patterns indicating the high-voltage utility power feed is experiencing voltage sag. In response to determining the high-voltage utility power feed is experiencing voltage sag, the energy control system may command the switching device assembly to route the high-voltage power feed to the transformer from the ESS device high-voltage power discharge instead of from the utility power source that is experiencing voltage sag. The cost reduction determination may include determining that a cost associated with the high-voltage utility power feed received from one of the utility power sources exceeds a threshold. For example, during peak hours in the summer, the cost per kilowatt-hour of electricity from a utility power source may exceed a set cost per kilowatt-hour threshold. The energy control system may command the switching device assembly to route the high-voltage power feed to the transformer from the ESS device during the time the cost per kilowatt-hour of electricity from the utility power source exceeds the threshold. Once the cost per kilowatt-hour of electricity from the utility power source falls below the threshold, the energy control system may command the at least one switching device assembly to route the high-voltage power feed to the transformer from the utility power source and charge the ESS device.

According to one embodiment, a system includes a data center, an energy storage system (ESS) configured to store high-voltage power received from one or more utility power sources and configured to discharge the stored high-voltage power, and an electrical substation. The electrical substation may be configured to distribute low-voltage power to the data center from one or more of the utility power sources or the ESS device. The electrical substation may include at least one switching device configured to selectively route a high-voltage power feed from a selected utility power source or the ESS device and a transformer configured to step down the high-voltage power feed received from the switching device into a low-voltage power feed supplied to the data center. For example, the ESS device may be located outside the substation and the at least one switching device may switch between routing high-voltage electrical feed to the transformer in the substation from a utility power source to routing high-voltage electrical feed to the transformer from the ESS device. The discharge from the transformer in the substation may feed low-voltage electrical power to one or more loads in the data center. In some embodiments, the ESS device may be in the electrical substation and the at least one switching device in the electrical substation may selectively route high-voltage electrical power to the transformer from the ESS device or from a utility power source.

According to one embodiment, a method includes determining an occurrence associated with a utility high-voltage power source feeding electrical power to a data center based on monitoring one or more parameters associated with the utility high-voltage power source. The utility high-voltage power source may feed electrical power to the data center via a high-voltage power feed and a transformer which steps down the high-voltage power feed to a low-voltage power feed supplied to the data center. The method includes directing at least one switching device to switch the high-voltage power feed from the utility high-voltage power source to a high-voltage discharge from an energy storage system (ESS) in response to determining the occurrence. The ESS device may be configured to store high-voltage power received from the utility high-voltage power source or discharge the stored high-voltage power as the high-voltage discharge. For example, an occurrence may include determining that a demand charge in kilowatts for high-voltage power from a utility source exceeds a threshold and in response a switching device may be directed to switch from feeding high-voltage electrical power from the utility power source to feeding high-voltage electrical power from the ESS device in response to the determination that the demand charge associated with the utility power source exceeds the threshold.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, one component in a power infrastructure is "downstream" from another component in the system if the one component receives power from the other component or is at a lower level in the system than the other component. For example, a floor power distribution unit (PDU) may be downstream from a UPS, or a data center may be downstream from a power plant.

As used herein, "floor power distribution unit" refers to a power distribution unit that can distribute electrical power to various components in a computer room. In some embodiments, a floor power distribution unit includes a transformer. In one embodiment, a floor power distribution unit includes a k-rated transformer. A power distribution unit may be housed in an enclosure, such as a cabinet.

As used herein, a "load", includes the output of a power infrastructure and the electrical power consumed by some or all of the power infrastructure, including the output. For example, a load in a power infrastructure may include a computing facility that consumes power distributed over the power infrastructure from a power source.

As used herein, a "module" is a component or a combination of components. A module may include functional elements and systems, such as computer systems, circuit boards, racks, blowers, ducts, and power distribution units, as well as structural elements, such a base, frame, housing, or container.

As used herein, "power distribution unit" means any device, module, component, or combination thereof, which can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, and isolation.

As used herein, a "power feed" includes power from any source, including but not limited to power received from a utility power source that can be supplied to an electrical load. In some embodiments, a "power feed" may be power received from a high-voltage energy storage system (ESS). In some embodiments, a "power feed" may be received from the output of a transformer. For example, a low-voltage power feed received from a transformer may include low-voltage power received over a low-voltage power transmission line coupled to the transformer.

As used herein, "power transmission line" means a line that transmits power from one component to another component. Examples of power transmission lines include conductors that carry power from a UPS to a floor PDU, conductors that carry power from a floor PDU to a rack PDU, and conductors that carry power from a rack PDU to a server power supply unit, and power lines. Power transmission lines may have any form, such as a cable, bus bar, or other conductive member or device.

As used herein, "primary power" means any power that can be supplied to an electrical load, for example, during normal operating conditions.

As used herein, a "rack" means a rack, container, frame, or other element or combination of elements that can contain or physically support one or more computing devices.

As used herein, "rack power distribution unit" refers to a power distribution unit that can be used to distribute electrical power to various components in a rack. A rack power distribution may include various components and elements, including wiring, bus bars, connectors, and circuit breakers. In some embodiments, a rack power distribution unit may distribute power to only some of the electrical systems in a rack. In some embodiments, a single rack includes two or more rack power distribution units that distribute power to different sets of electrical systems in the rack. For example, one rack may include a left rack power distribution unit that distributes power to half of the servers in the rack, and a right rack power distribution unit that distributes power to the other half of the servers in the rack.

As used herein, "reserve power" and "backup power" may refer interchangeably to power that can be supplied to an electrical load upon the failure of, or as a substitute for, primary power to the load. For example, a power feed from a backup generator may include backup power.

As used herein, "signal" includes an electrical or electromagnetic impulse, wave, tone, pulse, or combination thereof. A signal may serve to indicate, identify, inform, direct, instruct, command, or warn. A signal may be a discrete set of information (for example, a sequence of characters in a message), continuous (such as a wave), periodic, or a combination thereof. A signal may have any of various regular or irregular characteristics. In some embodiments, a signal includes one or more repeating characteristics, such as a sine wave, a square wave, or a saw tooth wave. In some embodiments, a signal has non-repeating characteristics. A signal can be applied to, or transmitted through, a single conductor or to a set of two or more conductors. In some embodiments, a signal is an electromagnetic signal transmitted through air (for example, a wireless signal). In some embodiments, a signal has characteristics of another signal. For example, a circuit may include a current, produced by an instrument transformer, which is a reduced current that is proportional to a full current in another circuit by a known or predetermined factor, such that the reduced current in the first circuit can be used to determine the full current in the other circuit.

As used herein, "stepping", "step up", "step down", and the like refer to changing a voltage. For example, a transformer that increases a voltage of a power feed from a low voltage to a high voltage "steps up" the voltage of the power feed. In another example, a transformer that decreases a voltage of a power feed from a high voltage to a low voltage "steps down" the voltage of the power feed.

As used herein, providing power "support" refers to providing one or more power feeds to be available to one or more downstream systems and components, including one or more electrical loads. Such provided power feeds may be precluded from being received by the systems and components but may be made available for receipt based at least in part upon a positioning of one or more components upstream of the systems and components. For example, a reserve power system may provide reserve power support to an electrical load by providing a reserve power feed that can be selectively routed to the load by a transfer switch that is downstream of the reserve power system and upstream of the load, where the transfer switch may selectively route the reserve power feed or a primary power feed to the load based at least in part upon one or more conditions associated with the primary power feed.

As used herein, "substation" or "electrical substation" includes a collection of one or more components that process power received from one or more power sources for distribution. In some embodiments, a substation includes transformers, switching devices, sensor equipment that generates data regarding received power, and switchgear. For example, an electrical substation that receives high-voltage power from two separate utility power sources may include a transformer that steps down the voltages to a medium voltage, switchgear to isolate power received from one or both of the power sources from downstream equipment, and sensor equipment that generate data regarding power received from one or both of the power sources. In some embodiments, a substation includes a high-voltage energy storage system (ESS).

As used herein, "switchgear" includes electrical switching devices, fuses, circuit breakers, or combinations thereof used to isolate components in an electrical system. Switchgear can isolate downstream components from upstream power feeds. In some embodiments, switchgear isolates components to protect the equipment from electrical faults elsewhere in an electrical system. For example, switchgear in a computing facility may isolate various electrical and computing systems in the facility from upstream power feeds.

As used herein, "switching device assembly" includes a set of electrical switches that can break one or more electrical currents. A switching device assembly can interrupt a power flow, divert one of the source or output of a power feed, etc. For example, a switching device assembly may selectively route a power feed from one of two or more sources to a single output.

As used herein, one component in a system is "upstream" from another component in the system if the one component supplies power to the other component or is at a higher level in the system than the other component. For example, an electrical substation supplying power to a data center may be upstream from the data center, or a transformer may be upstream from a UPS.

As used herein, "waveform" means a signal having one or more periodic characteristics. A waveform may be, for example, a sine wave having a particular frequency and amplitude.

As used herein, "waveform pattern" means a characteristic or set of characteristics of a signal that can be used to identify the occurrence or potential occurrence of an event associated with power transmitted over a power transmission line or from a power source. For example, a waveform pattern may be used to detect that power received from a first power source is experiencing a disturbance. As another example, a waveform pattern may be used to detect that power received over a first power transmission line may potentially be interrupted or fail. A waveform pattern may be established from output signals sensed at one or more points in a system. A waveform pattern may have any of various distinguishing characteristics. In some embodiments, a waveform pattern has distinguishing harmonic characteristics, such as a waveform having a particular shape, frequency, and amplitude. A waveform pattern may include elements of a carrier wave (such as a power transmission wave supplying power to electrical systems) and one or more additional signals.

A data center may include a primary power system and a secondary power system. The primary power system may provide electrical power to one or more loads in the data center and the secondary power system may be configured to provide electrical power to the loads in the data center when electrical power is not provided to the loads in the data center by the primary power system. The primary and secondary power systems may include local power supplies which can provide at least some electrical power in the absence of utility power. The local power supplies may include back-up generators, uninterruptible power supplies, etc. However, such power supplies may lack a capacity to provide sufficient power output to replace a lost utility power feed for extended periods. For example, a data center that includes multiple sets of rack computer systems, back-up generators and uninterruptible power supplies in primary and secondary power system of the data center may lack a capacity to meet electrical power requirements of the rack computer systems for an extended period of time. As a result, where utility power feeds are lost for an extended period of time (e.g., one hour), on-site back-up generators and uninterruptible power supplies may be exhausted by electrical power requirements of on-site electrical loads, thus leading to the loss of power to said loads.

One or more high-voltage energy storage systems (ESS) may provide a source of electrical power which can replace a utility power feed as a power source for an extended period of time. Such energy storage systems can include battery energy storage systems (BESS) which can discharge an electrical power feed which can support entire power systems for extended periods of time. For example, some high-voltage ESS devices can store and discharge 4 megawatts of electrical power, which can include an electrical power feed dischargeable over a period of time of multiple hours. Some high-voltage ESS devices can discharge electrical power at voltages over 40 kV. In some embodiments, high-voltage ESS devices are referred to as "grid energy storage" systems, "large-scale energy storage" systems, etc. High-voltage ESS devices can store electrical power received from one or more power sources, including a utility power feed, and can discharge high-voltage electrical power in the absence of receiving power from such power sources.

In some embodiments, one or more high-voltage energy storage systems (ESS) enable power feed redundancy at the substation level. For example, a power feed from a substation to a downstream data center may be coupled, on an upstream side, to both a utility power source and a high-voltage ESS device via a switching device assembly, where the switching device assembly can switch the power feed between the utility power feed from the utility power source and a discharge feed from the high-voltage ESS device, under certain conditions.

In some embodiments, a switching device assembly which can switch the feed from the substation to the data center between a utility power source and a high-voltage ESS device includes one or more switching devices which can be commanded to switch based at least in part upon a determination by an energy control system. In some embodiments, the energy control system monitors waveforms in power supplied to the substation from a utility power source and determines a potential interruption of power from the utility power source. The energy control system may command the switching device assembly to switch from feeding electrical power from the utility power source to feeding electrical power from the high-voltage ESS device based on determining a potential interruption of electrical power from the utility power source.

In some embodiments, the energy control system monitors costs associated with electricity from a utility power source, including consumption costs (price per kW-hour) and demand charges (price based on flow in kW). The energy control system may command the switching device assembly to switch from feeding electrical power from the utility power source to a downstream load to feeding electrical power from the high-voltage ESS device to the downstream load in response to a determination that one or more of the costs associated with the electrical power from the utility power source exceed one or more thresholds. For example, the consumption cost (i.e. price per kW-hour) associated with receiving electrical power from a utility power source may spike during certain portions of a day in summer months. When the consumption costs spikes, the cost associated with electrical power from the utility power source may exceed a threshold and the energy control system may command the switching device assembly to switch from feeding electrical power from the utility power source to feeding electrical power from a high-voltage ESS device. Later in the same day, after the consumption costs have subsided from the spike, the energy control system may command the switching device assembly to switch from feeding electrical power from the high-voltage ESS device to feeding electrical power from the utility power source based on the cost associated with electrical power from the utility power source falling below a threshold. After the switching device assembly switches the electrical power feed back to feeding from the utility power source, the high-voltage ESS device may store electrical power received from the utility power source.

FIG. 1 is a block diagram illustrating an electrical substation providing electrical power support to electrical loads in a data center, according to some embodiments. Electrical substations are referred to interchangeably herein as "substations". Substation 100 provides low-voltage electrical power to data center 102 via power transmission line 124. Substation 100 receives high-voltage electrical power from utility power sources 104, 106, and 108 respectively via power transmission lines 126, 128, and 130. The high-voltage power received by substation 100 from utility power sources 104, 106, and 108 passes through sensors 110, 112, and 114 before being routed to switching device assembly 120. High-voltage energy storage system (ESS) 118 is also coupled to switching device assembly 120. Switching device assembly 120 selectively routes high-voltage electrical power from power source 104, 106, 108, or high-voltage ESS device 118 to transformer 122 via high-voltage power feed 132. Transformer 122 steps down the voltage of high-voltage power feed 132 routed to transformer 122 into low-voltage feed 124 that feeds low-voltage power to data center 102. Electrical substation 100 may provide power received from one or more of a power source over one or more power transmission lines 126, 128, and 130, a high-voltage discharge of high-voltage ESS device 118 to data center 102 over power transmission line 124, etc.

High-voltage ESS device 118 can receive and store high-voltage electrical power routed from power source 104, 106, or 108 via switching device assembly 120 routing electrical power over power transmission line 148. Switching device assembly 120 may route electrical power from power sources 104, 106, and 108 over both power transmission lines 148 and 132 simultaneously. For example, switching device assembly 120 may be configured to route high-voltage power from power source 104 to transformer 122. Switching device assembly 120 may also route a portion of the electrical power from power source 104 to high-voltage ESS device 118, so that power source 104 is both feeding high-voltage electrical power to transformer 122 and high-voltage electrical power to high-voltage ESS device 118. High-voltage ESS device 118 may receive and store high-voltage power while switching device assembly 120 is routing high-voltage power from one of power sources 104, 106, or 108 to transformer 122. In the event of a loss of high-voltage power from a utility power source, high-voltage ESS device 118 may discharge high-voltage electrical power via the same connection used to receive high-voltage electrical power. For example, if power from power source 104 were lost and power sources 106 and 108 were unavailable, high-voltage ESS device 118 could discharge high-voltage electrical power to transformer 122 via switching device assembly 120 coupling the high-voltage ESS device 118 to transformer 122.

Energy control system 116 receives sensor signals from sensors 110, 112, and 114 and sends signals to switching device assembly 120. Energy control system 116 may also receive information from network 134, including costs associated with the electrical power from one or more of the utility power sources 104, 106, and 108. In FIG. 1, switching device assembly 120 is depicted as a single block, but, in some embodiments, comprises multiple switching devices configured to collectively selectively route high-voltage electrical power from a selected one of power sources 104, 106, 108 or high-voltage ESS device 118 to transformer 122. Energy control system 116 may monitor one or more of waveforms and costs of electrical power associated with utility power sources 104, 106, and 108, costs of electrical power associated with utility power sources 104, 106, and 108, some combination thereof, etc. Energy control system 116 may monitor power transmission lines 126, 128, and 130 for a loss of power feed from power sources 104, 106, or 108.

In some embodiments, one or more of electrical substation 100, data center 102, and energy control system 116 are part of a common facility, are controlled by a common entity, or some combination thereof. For example, electrical substation 100, energy control system 116, and data center 102 may be located in the same facility and be part of a common entity distinct from a power utility entity.

For illustrative purposes, three power sources 104, 106, and 108 are shown in FIG. 1. The number of power sources may, however, vary from embodiment to embodiment (and, within a given embodiment, from system to system). In addition, the number of any of the illustrated elements in FIG. 1 may vary from embodiment to embodiment (and, within a given embodiment, from system to system). For example, in some embodiments, electrical substation 100 may include multiple switching device assemblies 120 and multiple transformers 122.

In some embodiments, the power sources 104, 106, and 108 include one or more utility power sources, including one or more power plants. For example, in the illustrated embodiment, each of power sources 104, 106, and 108 can be an individual utility power source that generates power through utilization of one or more separate power plants.

In some embodiments, transformer 122 steps down voltage of a received power feed to a low voltage, such that an output power feed from the transformer to data center 102 over power transmission line 124 is low-voltage power. In some embodiments, transformer 122 steps down voltage of the received power feed to a medium voltage and transmits the moderate-voltage power output to another transformer (not shown in FIG. 1) to be stepped down further to a low voltage. For example, power transmission line 124 may distribute moderate-voltage power, and one or more additional transformers located proximate to, or as part of, data center 102 may step down moderate-voltage power to a specific low-voltage power required by specific loads in data center 102. In some embodiments, the additional transformer is a distribution transformer.

In some embodiments, power received at electrical substation 100 over one or more power transmission lines 126, 128, 130 can be selectively routed to be provided to data center 102 by one or more switching device assemblies 120. Switching device assembly 120 can isolate one or more power feeds from components downstream of the switching device assembly 120 and allow only power from one or more selected power sources to be passed to transformer 122 over power transmission line 132. For example, in the illustrated embodiment, switching device assembly 120 may switch between selectively routing power received over one of power transmission lines 126, 128, and 130 and selectively routing power stored in high-voltage ESS device 118 to transformer 122 to be stepped down to a low-voltage and transmitted to data center 102 over power transmission line 124.

In some embodiments, switching device assembly 120 is a high-voltage switching device that switches between one or more received high-voltage power feeds. For example, switching device assembly 120 may be a high-voltage switching device including one or more circuit breakers, switchgear, etc. that selectively routes one or more high-voltage power feeds by switching between the high-voltage power feeds. In some embodiments, the high-voltage switching device assembly 120 can switch between high-voltage power feeds without affecting the supply of power to data center 102. For example, where data center 102 includes computing systems, even brief power interruptions can disrupt normal operations of some or all of data center 102. In such an example, switching device assembly 120 may include a high-voltage switching device that can switch between high-voltage power feeds within about 0.5 to 0.8 seconds or within about 30 to 50 cycles in a 60 Hz power feed, which may be a sufficiently fast switching speed to ensure that data center 102 is not affected by the switching.

In some embodiments, such as where a high-voltage switching device is a "high-speed" switching device that can switch between high-voltage power feeds sufficiently quickly to avoid affecting operations of computing systems in data center 102, data center 102 may not require an uninterruptible power source (UPS) to provide reasonable security against power interruptions affecting operations of computer systems in data center 102.

Energy control system 116 is coupled to at least a part of electrical substation 100 and data center 102 and manages the supply of power to data center 102 by monitoring one or more waveforms of one or more power sources fed to the electrical substation 100 and controlling which power source is fed to data center 102 based on the waveform monitoring. In some embodiments, energy control system 116 is coupled to one or more components in electrical substation 100. For example, in the illustrated embodiment, energy control system 116 is coupled to sensors 110, 112, and 114 by way of lines 136, switching device assembly 120 by way of line 138, and data center 102 by way of line 140. Lines 136, 138, and 140 may each be, in various embodiments, a cable, an electrical bus, or a combination thereof. In some embodiments, one or more of lines 136, 138, and 140 include a wireless connection between energy control system 116 and the coupled component. For example, energy control system 116 may be remotely located from both electrical substation 100 and data center 102 and coupled to components in each by way of one or more wireless connections.

In some embodiments, sensor devices 110, 112, and 114 are high-voltage instruments that provide data regarding one or more high-voltage power feeds. Such data can include one or more signals that include characteristics associated with the power feed. For example, sensor devices 110, 112, and 114 can include instruments including one or more of a current transformer and a potential transformer that can provide data indicating respective measurements of the current and voltage of a high-voltage power feed. In some embodiments, data generated by sensor devices 110, 112, and 114 includes a signal having characteristics that are proportional to characteristics of a power feed by a known factor, such that the data can be used to determine characteristics of the power feed.

In some embodiments, energy control system 116 manages which high-voltage power source is selectively routed to data center 102 by switching device assembly 120, from one or more of power sources 104, 106, 108, ESS device 118, etc., based at least in part upon monitoring a waveform of high-voltage power received over one or more of the high-voltage power transmission lines 126, 128, and 130. For example, energy control system 116 may use data collected over lines 142 to monitor a high-voltage power feed being received over power transmission line 126 from power source 104 and routed by switching device assembly 120 to transformer 122 by monitoring a waveform of the high-voltage power feed and determining, based at least in part on monitoring the waveform, characteristics of the high-voltage power feed and further determining whether to switch from routing the high-voltage power feed to data center 102 to routing another power feed to data center 102 or routing a power feed to data center 102 from high-voltage ESS device 118.

In some embodiments, the data collected by the energy control system 116 represents the power feed as a waveform. A power feed may appear as a modulation of a sinusoidal wave (for example, a 60 Hertz sinusoidal wave). In some embodiments, a power feed is a waveform at a defined frequency and amplitude. For example, energy control system 116 may collect voltage data associated with high-voltage power received over power transmission line 126 that represents the variation of voltage in the power transmission line 126 over time as a waveform.

The energy control system 116 may direct components in substation 100 to switch the source of power fed to data center 102 from a first high-voltage power source to a second high-voltage power source or to a high-voltage power source from high-voltage ESS device 118. In some embodiments, the energy control system 116 monitors waveforms of one or more high-voltage power feeds received from one or more high-voltage power sources 104, 106, and 108; and based on the monitoring, directs switching device assembly 120 to switch between two or more high-voltage power feeds or high-voltage ESS device 118. In some embodiments, energy control system 116 directs switching from a first high-voltage power feed to a second high-voltage power feed upon determining that the first high-voltage power feed may potentially be interrupted. By directing switching between power feeds before the potential power interruption occurs, energy control system 116 enables a steady, uninterrupted supply of high-voltage power to transformer 122 and thus a steady, uninterrupted supply of power to data center 102, thereby preventing power interruptions at data center 102. In some embodiments, energy control system 116 directs switching from a high-voltage power feed to a high-voltage feed from high-voltage ESS device 118 upon determining that a suitable power source is not available from among power sources 104, 106, and 108.

In some embodiments, energy control system 116 directs switching of the switching device assembly 120 from feeding high-voltage electrical power from one of power sources 104, 106, or 108 to data center 102 to feeding high-voltage electrical power from high-voltage ESS device 118 to data center 102 upon determining that a high-voltage power feed from the one of power source 104, 106, or 108 may potentially be interrupted and no other high-voltage power feeds from power sources 104, 106, or 108 are available. Energy control system 116 may direct switching back to a high-voltage power feed from one of power sources 104, 106, or 108 upon determining that one or more of the high-voltage power sources are stable. For example, energy control system 116 may continuously monitor waveforms from each high-voltage power feed received over power transmission lines 126, 128, and 130, even if one or more of the high-voltage power feeds is not routed to transformer 122 by switching device assembly 120, and may switch between high-voltage power feeds and the high-voltage ESS device 118 based upon waveforms in one or more of the high-voltage power feeds.

In some embodiments, energy control system 116 directs switching to the high-voltage ESS device 118 even if one or more high-voltage power feeds are available and stable. For example, the available and stable high-voltage power feeds may include undesirable characteristics, including unfavorable usage costs, unfavorable demand charges, known historical tendencies to become unstable on short notice, etc., such that the energy control system 116 may determine that the high-voltage ESS device 118 provides a more stable and efficient supply of power to data center 102.

Any of the configurations described in FIGS. 2-5 may be implemented in the system described in regard to FIG. 1.

Figure 2:
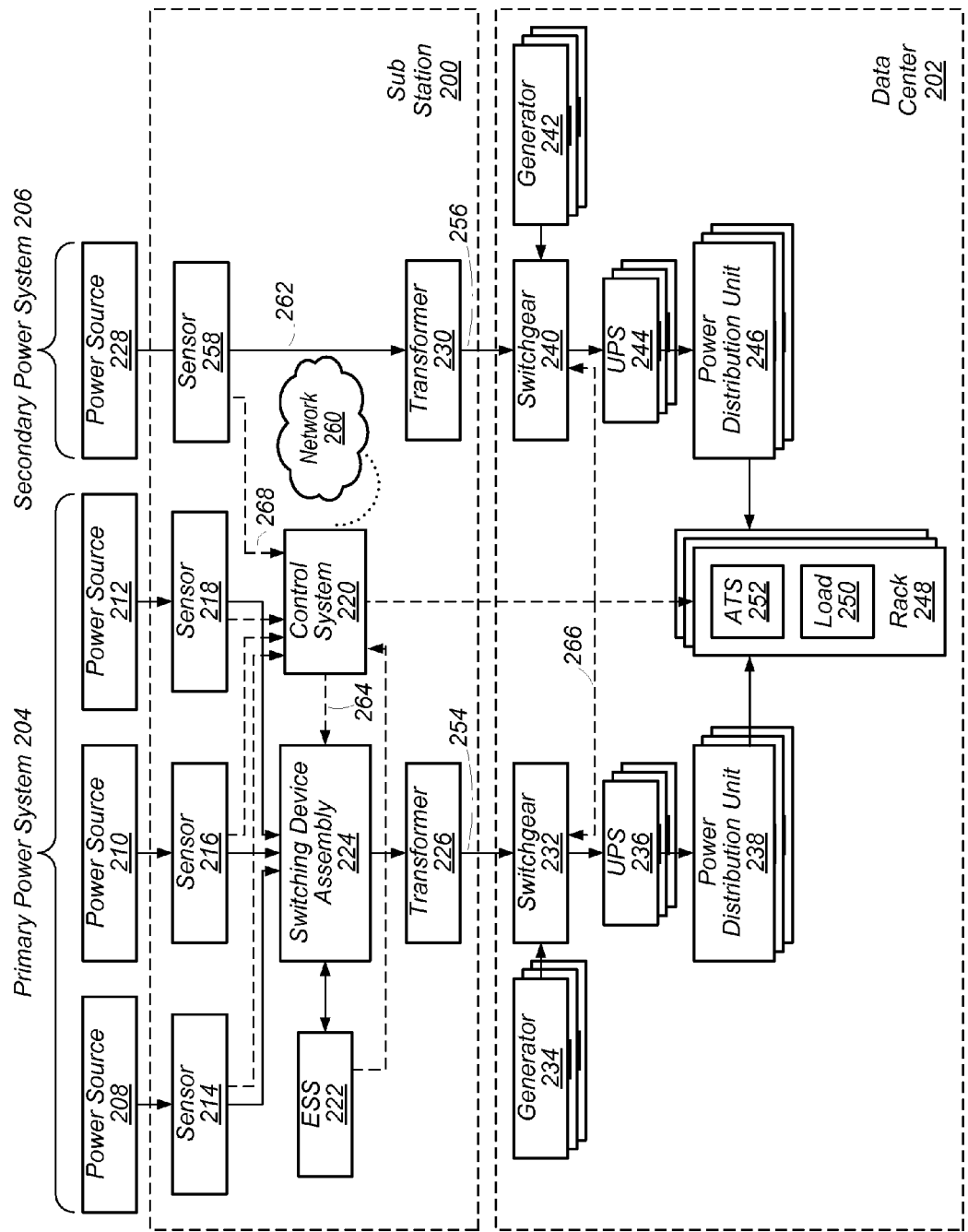
FIG. 2 is a schematic illustrating a primary power system and secondary power system supporting electrical loads in a data center, and a high-voltage energy storage system (ESS) providing power feed support to the feed to the primary power system, according to some embodiments.

FIG. 2 is a schematic illustrating a primary power system and a secondary power system supporting electrical loads in a data center, and a high-voltage energy storage system (ESS) providing power feed support in the feed to the primary power system, according to some embodiments. Substation 200 provides low-voltage electrical power to data center 202 via power transmission lines 254 and 256. Power transmission line 254 is part of primary power system 204 that receives high-voltage electrical power from power sources 208, 210, 212, or the discharge of high-voltage ESS device 222 and provides low-voltage electrical power to data center 202. Power transmission line 256 is part of secondary power system 206 that receives high-voltage electrical power from power source 228 and provides low-voltage electrical power to data center 202. Primary power system 204 comprises sensors 214, 216, 218, high-voltage ESS device 222, switching device assembly 224, energy control system 220 and transformer 226 in substation 200. Primary power system 204 also comprises switchgear 232, generator 234, uninterruptible power supply (UPS) 236, and power distribution unit 238 in data center 202. Secondary power system 206 comprises transformer 230 in substation 200. In some embodiments transformer 226 and 230 may be in separate substations. Secondary power system 206 comprises switchgear 240, generator 242, switchgear 240, UPS 244, and power distribution unit 246 in data center 202.

In some embodiments, one or more of electrical substation 200, data center 202, and energy control system 220 are part of a common facility, are controlled by a common entity, or some combination thereof. For example, electrical substation 200, energy control system 220, and data center 202 may be located in the same facility and be part of a common entity distinct from a power utility entity.

For illustrative purposes, three power sources 208, 210, and 212 are shown in FIG. 2. The number of power sources may, however, vary from embodiment to embodiment (and, within a given embodiment, from system to system). In addition, the number of any of the illustrated elements in FIG. 2 may vary from embodiment to embodiment (and, within a given embodiment, from system to system). For example, in some embodiments, electrical substation 200 may include multiple switching device assemblies 224 and multiple transformers 226.

Switching device assembly 224 in primary power system 204 receives high-voltage electrical power from power sources 208, 210, 212 or high-voltage ESS device 222. Energy control system 220 sends one or more signals to switching device assembly 224 over lines 264 to command individual switches in switching device assembly 224 to selectively route electrical power from a selected power source such as power source 208, 210, 212, or high-voltage ESS device 222. Switching device assembly 224 routes electrical power received from the selected high-voltage power source to transformer 226. Transformer 226 steps down the high-voltage power feed to a low-voltage power feed to data center 202. Power transmission line 254 transmits the low-voltage electrical power from transformer 226 to switchgear 232 in primary power system 204 of data center 202.

Switchgear 232 selectively switches between feeding low-voltage power from generator 234 or low-voltage power received via power transmission line 254. Switchgear 232 may receive a signal from energy control system 220 via line 266 indicating whether to feed electrical power from power transmission line 254 or generator 234. Switchgear 232 feeds low-voltage electrical power from the chosen power source to UPS 236 in data center 202. UPS 236 feeds the electrical power received from switchgear 232 to power distribution unit 238. UPS 236 also stores electrical power and provides short-term electrical power support to power distribution unit 238 when electrical power is not fed from switchgear 232. For example, when switchgear 232 is commanded to selectively switch from feeding electrical power from power transmission line 254 to feeding electrical power from generator 234, there may be a short period of time when no electrical power is fed to UPS 236 while switchgear 232 switches feeds. During this short period of time, UPS 236 may continue to provide electrical power to power distribution unit 238 so that loads 250 in rack 248 have a continuous source of electrical power.

Power distribution unit 238 distributes power from UPS 236 to multiple loads 250 in racks 248. Groups of loads 250 in racks 248 are fed electrical power via automatic transfer switches 252. Automatic transfer switch 252 preferentially feeds electrical power to loads in racks 248 from primary power system 204. If electrical power feed from primary power system 204 is not available, automatic transfer switch 252 automatically switches to feeding loads 250 in racks 248 from secondary power system 206. In some embodiments, energy control system 220 may command automatic transfer switch 252 to selectively feed electrical power to loads 250 in racks 248 from either primary power system 204 or secondary power system 206.

Similar to primary power system 204, secondary power system 206 receives electrical power from power source 228 which feeds high-voltage electrical power to transformer 230 in substation 200. Transformer 230 steps down the high-voltage power received from power source 228 into low-voltage electrical power fed to data center 202 via power transmission line 256. Sensor 258 is coupled to the feed from power source 228 and monitors one or more characteristics of the electrical power received from power source 228 including one or more waveform patterns. Sensor 258 sends sensor signals to energy control system 220 via line 268.

Switchgear 240 of secondary power system 206 in data center 202 is fed low-voltage electrical power from transformer 230 via power transmission line 256. Switchgear 240 is also coupled to generator 242 and selectively switches between feeding low-voltage power to UPS 244 from power transmission line 256 or generator 242 based on one or more signals received from energy control system 220. UPS 244 functions similarly to UPS 236 of primary power system 204. UPS 244 feeds low-voltage electrical power to power distribution unit 246 and provides backup power support during short duration interruptions of power feed from switchgear 240. Power distribution unit 244 functions similarly to power distribution unit 238 in primary power system 204 and distributes low-voltage electrical power to one or more loads 250 in racks 248 via automatic transfer switches 252, when automatic transfer switches 252 are feeding electrical power from secondary power system 206.

In the embodiment illustrated in FIG. 2 high-voltage ESS device 222 is coupled to primary power system 204. In some embodiments, high-voltage ESS device 222 is coupled to the secondary power system 206 via a switching device assembly 224 between power source 228 and transformer 230 in power transmission line 262. In some embodiments, primary power system 204 and secondary power system 206 both comprise a high-voltage ESS device 222.

Energy control system 220 receives sensor signals from sensors 214, 216, 218, and 258. Sensors 214, 216, and 218 measure characteristics of power sources 208, 210, and 212 in primary power system 204 including waveform patterns associated with power sources 208, 210, and 212. Sensor 258 measures characteristic of power source 228 in secondary power system 206 including waveform patterns associated with power source 228.

In some embodiments, energy control system 220 receives costs associated with the electrical power from the utility power sources 208, 210, 212, and 228 via network 260. Based at least in part upon one or more of the received sensor signals from sensors 214, 216, 218, and 258, the costs received via network 260, some combination thereof, etc., energy control system 220 determines a particular power source to supply electrical power to loads 250 in data center 202 or determines an occurrence of a power event that indicates the particular power source supplying electrical power to loads 250 in data center 202 needs to be switched to a different particular power source including one of power sources 208, 210, 212 or a high-voltage discharge feed from high-voltage ESS device 222. For example, if power source 228 is unavailable and sensor signals from sensors 214, 216, and 218 indicate one or more waveform patterns associated with each of power sources 208, 210, and 212 match a waveform pattern indicating a potential loss of power feed, energy control system 220 may determine high-voltage ESS device 222 is the desired power source to supply electrical power to loads 250 in data center 202. In another example, energy control system 220 may initially determine that power source 208 is the desired power source to supply electrical power to loads 250 in data center 202. Subsequently energy control system may determine the occurrence of a power event based on sensor signals from sensor 214 indicating a potential interruption of electrical power feed from power source 208. In response to the occurrence of the power event, control system 220 may command switching device assembly 224 to feed electrical power from power source 210 instead of from power source 208. In another example, energy control system 220 may determine that power is not available from any of power sources 208, 210, and 212 and command switching device assembly 224 to feed high-voltage electrical power from high-voltage ESS device 222 in response to the occurrence of a power event. In another example, the occurrence of a power event may be the costs associated with feeding electrical power from power source 208 exceed one or more thresholds. In response, to the occurrence of a power event, energy control system 220 may command switching device assembly 224 to feed electrical power from a high-voltage discharge power feed from high-voltage ESS device 222 instead of feeding high-voltage electrical power from power source 208 that has associated costs that exceed the demand charge threshold.

In response to determining to feed electrical power from high-voltage ESS device 222, energy control system 220 may command switching device assembly 224 to isolate feeds from power sources 208, 210, and 212 and couple the high-voltage discharge from high-voltage ESS device 222 to transformer 226. In another example, if energy control system 220 receives sensor signals from sensors 214, 216, and 218 indicating a waveform pattern associated with power sources 208, 210, and 212 match a waveform pattern indicating a potential power interruption and energy control system 220 receives sensor signals from sensor 258 associated with power source 228 in secondary power system 206 that does not indicate a waveform pattern matching a waveform profile indicating a potential interruption of power supply, energy control system 220 may command automatic transfer switch 252 to feed electrical power to loads 250 in racks 248 from power source 228 via secondary power system 206. In this scenario, primary power system 204 would become a reserve power system and if power was lost from power source 228, energy control system 220 would command switching device assembly 224 and automatic transfer switch 252 to selectively feed electrical power to loads 250 in racks 248 from high-voltage ESS device 222 supplying high-voltage power to transformer 226.

In another example, energy control system 220 may determine that the costs associated with feeding electrical power from power sources 208, 210, 212, and 228 exceed one or more thresholds. Energy control system 220 may determine that the anticipated time of a spike in prices associated with feeding electrical power from power sources 208, 210, 212, and 228 would cause costs associated with feeding electrical power from power sources 208, 210, 212, and 228 to remain above one or more thresholds for a predicted amount of time. Energy control system 220 may determine that the predicted amount of time that the prices will be spiked such that costs would exceed the threshold is less than the amount of time that high-voltage ESS device 222 can provide high-voltage electrical power based on the current charge in high-voltage ESS device 222. In response to determining that high-voltage ESS device 222 has sufficient charge to supply electrical power for the duration of the peak prices associated with feeding power from power sources 208, 210, 212, and 228, energy control system 220 may command switching device assembly 224 to feed high-voltage electrical power from high-voltage ESS device 222 to transformer 226 and command switching device assembly 224 to isolate the power feeds from power sources 208, 210, and 212. Energy control system 222 may continue to monitor the costs associated with receiving electrical power from power sources 208, 210, 212, and 228 and in response to determining that the costs have fallen below a threshold, command switching device assembly 224 to feed power from one of power sources 208, 210, 212, wherein feeding power from one of power sources 208, 210, and 212 also feeds power to high-voltage ESS device 222 and charges high-voltage ESS device 222.

In some embodiments, energy control system 220 may selectively command switching device assembly 224, switchgear 232, switchgear 240, and automatic transfer switch 252 to route electrical power to loads 250 in racks 248 from any of power sources 208, 210, 212, 228, high-voltage ESS device 222, generator 234, or generator 242.

Figure 3:
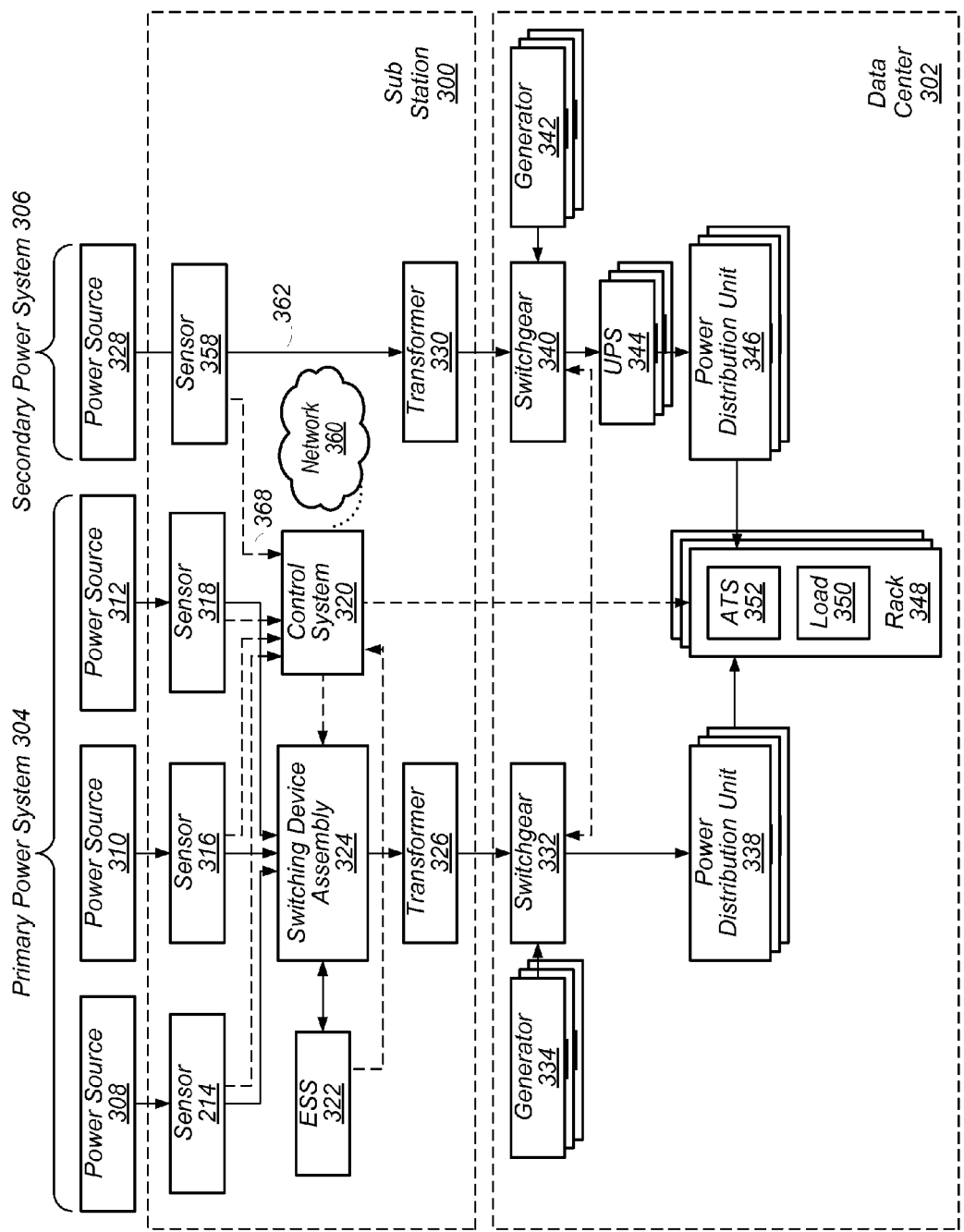
FIG. 3 is a schematic illustrating a primary power system and secondary power system supporting electrical loads in a data center, and a high-voltage energy storage system (ESS) providing power feed support to the primary power system where the primary power system does not include an uninterruptible power supply, according to some embodiments.

FIG. 3 is a schematic illustrating a primary power system and secondary power system supporting electrical loads in a data center, and a high-voltage energy storage system (ESS) providing reserve power support to the primary power system where the primary power system does not include an uninterruptible power supply, according to some embodiments. Primary power system 304 and secondary power system 306 are configured similarly to primary power system 204 and secondary power system 206 in FIG. 2, except primary power system 304 does not include an uninterruptible power supply. Some high-voltage ESS devices may switch from storing high-voltage electrical power to providing high-voltage electrical power in less than a second. Primary power system 304 may be configured so that switching device assembly 324 receives high-voltage electrical power from power sources 308, 310, and 312. Switching device assembly 324 selectively feeds high-voltage electrical power from a selected one of power sources 308, 310, and 312 to transformer 326. Switching device assembly 324 also feeds high-voltage electrical power from the selected power source to high-voltage ESS device 322. When high-voltage electrical power is being fed from one of power sources 308, 310, or 312 high-voltage ESS device 322 stores electrical power until high-voltage ESS device 322 is completely charged. In the event of a loss of power feed from the selected power source, high-voltage ESS device 322 nearly instantaneously begins to discharge electrical power such that the voltage of the electrical supply to transformer 326 does not appreciably drop.

For example, switching device assembly 324 may be configured to supply electrical power from power source 310. Switching device assembly 324 may feed electrical power from power source 310 to transformer 326 and to high-voltage ESS device 322. An interruption of power may occur in power source 310. High-voltage ESS device 322, which is currently receiving high-voltage electrical power from power source 310 via a connection to switching device assembly 324 may begin to discharge high-voltage electrical power via the same connection to switching device 324 and provide continuous power supply while switching device assembly 324 switches to feeding from a different power source, for example power source 308. In the event neither power source 308 or 312 are available, energy control system 320 may determine high-voltage ESS device is to continue to provide high-voltage electrical power to transformer 326. In this case, energy control system 320 may command switching device assembly 324 to isolate the discharge of high-voltage ESS device 322 from power sources 308, 310, and 312. In some embodiments, energy control system 320 may determine to supply electrical power to loads 350 in racks 348 from high-voltage ESS device 322 until the charge remaining in high-voltage ESS device 322 reaches a threshold (i.e. 30% charge remaining). After the charge remaining in high-voltage ESS device 322 reaching a threshold, energy control system 320 may command electrical power be supplied to loads 350 in racks 348 via an alternate energy source such as generator 334 or generator 342.

In some embodiments, high-voltage ESS device 322 may be located in secondary power system 306 in power transmission line 362 between power source 328 and transformer 330. In some embodiments both primary power system 304 and secondary power system 306 may comprise a high-voltage ESS device 322. In the illustrated embodiment, secondary power system 306 comprises UPS 344. In some embodiments, secondary power system 306 may comprise a high-voltage ESS device 322 and not include UPS 344.

Figure 4:
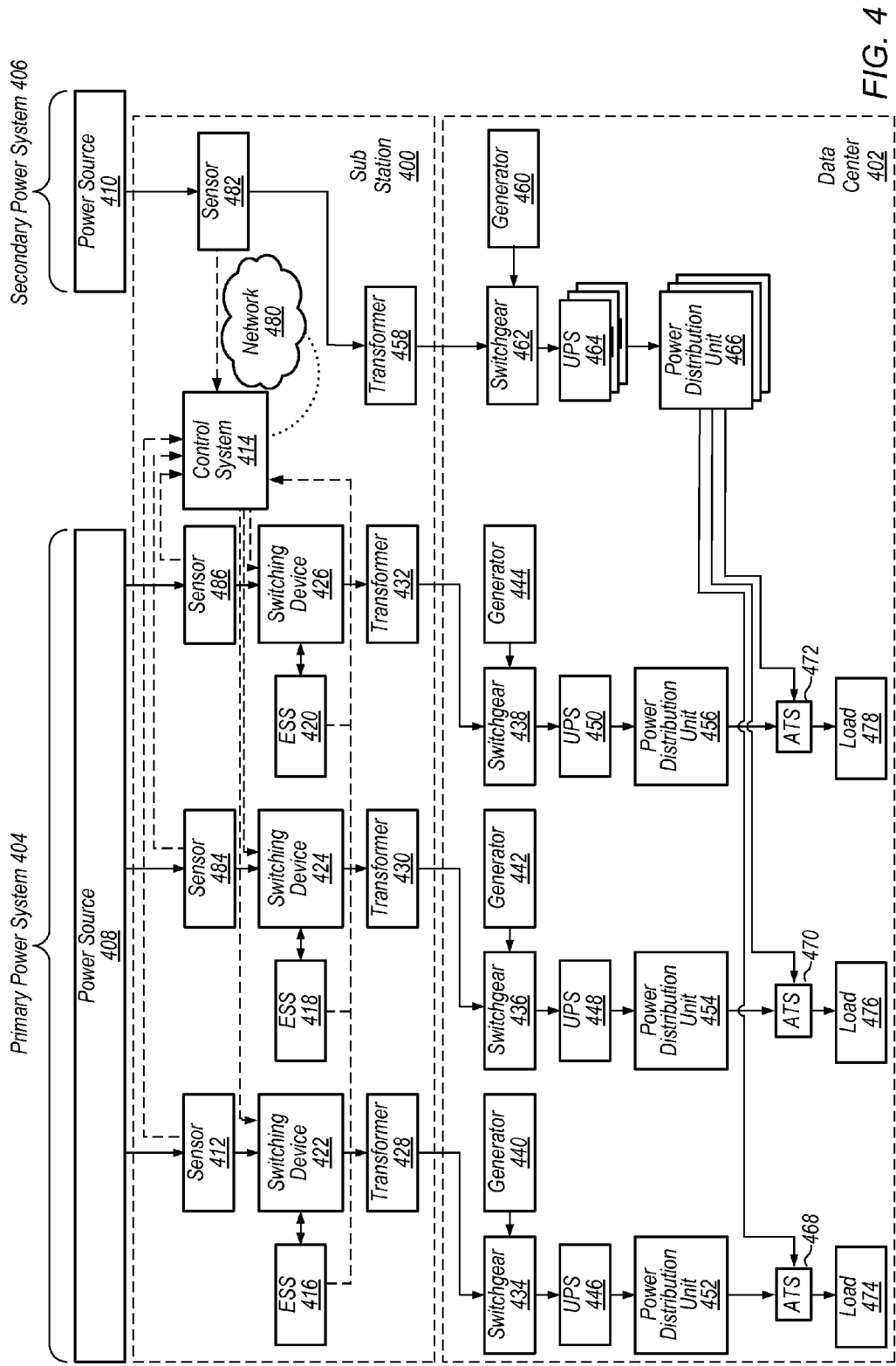
FIG. 4 is a schematic illustrating a primary power system and secondary power system supporting electrical loads in a data center, and multiple high-voltage energy storage systems (ESSs) providing power feed support to multiple feeds of multiple legs of the primary power system, according to some embodiments.

FIG. 4 is a schematic illustrating a primary power system and secondary power system supporting electrical loads in a data center, and multiple high-voltage energy storage systems (ESSs) providing power feed support to multiple feeds of multiple legs of the primary power system, according to some embodiments. Power source 408 feeds primary power system 404 and power source 410 feeds secondary power system 406. In the illustrated embodiment, substation 400 comprises both primary power system 404 and secondary power system 406. In some embodiments components of primary power system 404 and secondary power system 406 may be in separate substations. At the substation level, primary power system 404 comprises switching device assemblies 422, 424, and 426, high-voltage ESS devices 416, 418, and 420, transformers 428, 430, and 432, sensors 412, 484, and 486, and energy control system 414. Switching device assemblies 422, 424, and 426 selectively feed high-voltage electrical power to respective transformers 428, 430, and 432 from power source 408 or from high-voltage ESS devices 416, 418, and 420 based on command signals from energy control system 414.

Transformers 428, 430, and 432 are fed high-voltage electrical power and step down the high-voltage electrical power to low-voltage electrical power. Low-voltage electrical power from transformers 428, 430, and 432 is fed to switchgears 434, 436, and 438 in data center 402. Switchgears 434, 436, and 438 may feed low-voltage electrical power to UPSs 446, 448, and 450 from the low-voltage electrical power fed from transformers 428, 430, and 432, or feed low-voltage electrical power from generators 440, 442, or 444. The low-voltage power is fed from UPSs 446, 448, and 450 to loads 474, 476, and 478 in data center 402 via power distribution units 452, 454, and 456 and automatic transfer switches 468, 470, and 472.

Power source 410 feeds transformer 458 of secondary power system 406 in substation 400. Transformer 458 steps down high-voltage electrical power from power source 410 into low-voltage electrical power fed to switchgear 462 in data center 402. Switchgear 462 selectively feeds low-voltage electrical power to UPS 464 from the low-voltage electrical power fed from transformer 458 or from generator 460. Electrical power is fed from UPS 464 to loads 474, 476, and 478 via power distribution unit 466 and automatic transfer switches 468, 470, and 472. Automatic transfer switches 468, 470, and 472 preferentially feed electrical power from primary power system 404. In the event of a loss of power from primary power system 404 or in response to a command from energy control system 414, automatic transfer switches 468, 470, and 472 may feed electrical power to loads 474, 476, and 478 from secondary power system 406. In the illustrated embodiment power source 408 feeds three switching device assemblies and associated high-voltage ESS devices. In some embodiments, a power source may feed more or less switching device assemblies with associated high-voltage ESS devices. In some embodiments, more than one power source may feed switching device assemblies 422, 424, and 426.

Energy control system 414 receives sensor signals from sensors 412, 482, 484, and 486. Sensors 412 and 482 monitor characteristics of electrical power received from power sources 408 and 410 including waveform patterns. Energy control system 414 compares the monitored waveform patterns to stored waveform patterns indicating a potential loss of power supply. In response to determining a waveform associated with a power source matches a waveform pattern indicating a potential loss of power supply, for example determining that a waveform associated with power source 408 matches a waveform pattern associated with a potential loss of power supply, energy control system 414 may command automatic transfer switches 468, 470, and 472 to feed loads 474, 476, and 478 with electrical power from secondary power system 406. In some embodiments, in response to determining a waveform associated with a power source matches a waveform pattern indicating a potential loss of power supply, energy control system 414 may command one or more of switching devices 422, 424, and 426 to selectively feed high-voltage electrical power to transformers 428, 430, and 432 from high-voltage ESS devices 416, 418, and 420.

In some embodiments, energy control system may command switching devices 422, 424, and 426 to provide high-voltage electrical power to transformers 428, 430, and 432 before commanding generators 440, 442, and 444 to provide reserve power to loads 474, 476, and 478 in primary power system 404. Feeding high-voltage electrical power from high-voltage ESS devices 416, 418, and 420 during a loss of power from power source 408 may eliminate the need to utilize generators 440, 442, and 444 thus reduce air emissions from data center 402 associated with producing electrical power using generators 440, 442, or 444. In some embodiments, energy control system 414 may monitor the remaining charge in high-voltage ESS devices 416, 418, and 420 while high-voltage electrical power is being fed from high-voltage ESS devices 416, 418, and 420 and may command switching device assemblies 422, 424, and 426 and switchgears 434, 436, and 438 to provide electrical power from generators 440, 442, and 444 instead of feeding high-voltage power from high-voltage ESS devices 416, 418, and 420 during a loss of power source 408 event in response to determining the monitored charge in high-voltage ESS devices 416, 418, and 420 falls below a threshold charge.

For example, electrical power feed from power source 408 may be lost. Energy control system 414 may command switching device 422 to feed electrical power to transformer 428 from high-voltage ESS 416. After providing electrical power to transformer 428 for a time, the remaining charge in ESS device 416 may fall below a threshold (e.g., less than 30% charge remaining). In response to the remaining charge in ESS device 416 falling below the threshold, energy control system 414 may command switching device 422 to isolate high-voltage ESS device 416 and power source 408 from transformer 428 and command switchgear 434 to electrically couple the output of generator 440 to UPS 446. Energy control system 414 may command generator 440 to begin feeding electrical power to UPS 440 in response to determining the remaining charge in high-voltage ESS device 416 is below the threshold and in response to isolating high-voltage ESS device 416 from transformer 428 and coupling generator 440 to UPS 446.

Energy control system 414 may receive one or more costs associated with electrical power supplied from power source 408 and power source 410 via network 480. In response to determining one or more costs exceed a threshold, energy control system 414 may command one or more of switching device assemblies 422, 424, or 426, including a limited selection thereof, to feed high-voltage electrical power to one or more of transformers 428, 430, and 432 from one or more of high-voltage ESS devices 416, 418, or 420.

For example, the one or more costs associated with receiving electrical power from power source 408 may include a demand charge measured as the highest flow of electricity in kilowatts from power source 408 measured during a set amount of time (i.e. during a 15 minute increment). In response to receiving cost information via network 480 including a current demand charge and incremental demand charges associated with other flow rates, energy control system 414 may determine an optimal electrical power flow from power source 408 (kilowatts) that minimizes demand charges. In order to implement the determined optimized flow of electrical power, energy control system 414 may command one or more of switching device assemblies 422, 424, and 426 to selectively feed high-voltage power from high-voltage ESS devices 416, 418, or 420 to reduce the overall flow of electrical power from power source 408 and to reduce the resulting demand charge associated with the flow of electrical power from power source 408. In some embodiments, energy control system 414 may select one or more high-voltage ESS devices 416, 418, or 420 to feed high-voltage electrical power based on a priority associated with the respective one or more high-voltage ESS devices, where the priority is determined based on the current stored charge of each respective high-voltage ESS device. In some embodiments, the priority may be based on the high-voltage ESS device associated with the leg of primary power system 404 that has the lowest flow of electrical power. For example, if the leg associated with high-voltage ESS device 416 is flowing half as much electrical power to load 474 as the legs associated with high-voltage ESS devices 418 and 420, energy control system 414 may prioritize high-voltage ESS device 416 to be the highest priority high-voltage ESS device to provide high-voltage power in response to cost reduction monitoring. By selecting the high-voltage ESS device associated with the leg of primary power system 404 with the lowest flow, the amount of time that electrical power can be fed from a high-voltage ESS device is maximized assuming all high-voltage ESS devices are fully charged or equally charged.

For example, energy control system 414 may determine that a current demand charge associated with feeding electrical power from power source 408 exceeds a threshold and may determine the feed of electrical power from power source 408 needs to be supplemented with high-voltage electrical power from one or more of high-voltage ESS devices 416, 418, or 420 to reduce the demand charge below the threshold. In order to select which ones of high-voltage ESS devices 416, 418, and 420 to feed electrical power to supplement the flow of electrical power from power source 408, energy control system 414 may determine which load associated with a particular leg of primary power system 404 is feeding the lowest flow of electrical power. For example, energy control system 414 may determine that load 474 receives less power than loads 476 and 478. Energy control system 414 may compare the present flow of electrical power that is causing the demand charge to exceed the threshold and determine an estimated flow of electrical power if load 474 is fed electrical power from high-voltage ESS device 416 instead of from power source 408. In other words, energy control system 414 may subtract the electrical power flow feeding load 474 from the overall power flow from power source 408 to determine an estimated flow of electrical power from power source 408 if load 474 were fed electrical power from high-voltage ESS device 416 instead of from power source 408. If the determined estimated flow reduces the overall flow such that the demand charge is less than the threshold, energy control system 414 may command switching device assembly 422 to feed high-voltage electrical power from high-voltage ESS device 416 and command switching device assembly 422 to isolate power source 408 from transformer 428 so that electrical power is fed to load 474 from high-voltage ESS device 416 instead of power source 408.

If energy control system 414 determines that switching the power feed to load 474 from power source 408 to the discharge from high-voltage ESS device 416 does not reduce the overall flow from power source 408 such that the demand charge is below the threshold, energy control system 414 may repeat a similar process to determine if feeding electrical power to another load from a high-voltage ESS device, for example feeding load 476 from high-voltage ESS device 418 instead of from power source 408, would reduce the overall flow from power source 408 such that the demand charge is below the threshold. If switching the power feed associated with load 476 would not reduce the power flow from power source 408 such that the demand charge is below the threshold, energy control system may estimate the effect of feeding electrical power to load 478 from high-voltage ESS device 420 instead of feeding electrical power to load 478 from power source 408. If none of the estimated flows associated with respectively feeding electrical power to loads 474, 476, or 478 from respective high-voltage ESS devices 416, 418, or 420 reduce the demand charge below the threshold, energy control system 414 may determine different combinations of feeding two or more of loads 474, 476, or 478 from respective high-voltage ESS devices 416, 418, or 420 to reduce the demand charges below the threshold.

In some embodiments, energy control system 414 may command switching device assemblies 422, 424, and 426 to stop feeding high-voltage electrical power from ESS devices 416, 418, and 420 if the remaining charge in a particular high-voltage ESS device falls below a threshold. As a result of a particular ESS device stopping feeding high-voltage electrical power in response to the remaining charge in the particular high-voltage ESS device falling below a threshold, a reserve amount of charge may be maintained in the particular high-voltage ESS device. The reserve amount of charge remaining in the high-voltage ESS device may provide a high-voltage power source for subsequent interruptions of a utility power source. For example, a particular high-voltage ESS device may provide high-voltage electrical power in response to a demand charge exceeding a threshold. If the remaining charge in the particular ESS device falls below a threshold (e. g. 30%), energy control system 414 may command one of switching device assemblies 422, 424, or 426 to feed high-voltage electrical power from power source 408 instead of from the particular ESS device even though the costs of the power associated with power source 408 exceed the demand charge threshold. Subsequent to switching to feed high-voltage power from power source 408 and maintaining the reserve amount of charge in the high-voltage ESS device, power supply from power source 408 may be lost due to a failure in power source 408. Energy control system 414 may command the particular ESS device to feed high-voltage power from the reserve amount of charge remaining in the particular ESS, so that power feed is maintained while power source 408 is unavailable. In order to stop feeding high-voltage power from the particular high-voltage ESS device, one or more of switching device assemblies 422, 424, and 426 may electrically couple power source 408 to a respective transformer previously receiving high-voltage electrical power from the particular high-voltage ESS device and couple the particular high-voltage ESS device to power source 408. In this way, power source 408 will feed the load associated with the transformer and will charge the high-voltage ESS device.

Figure 5A:
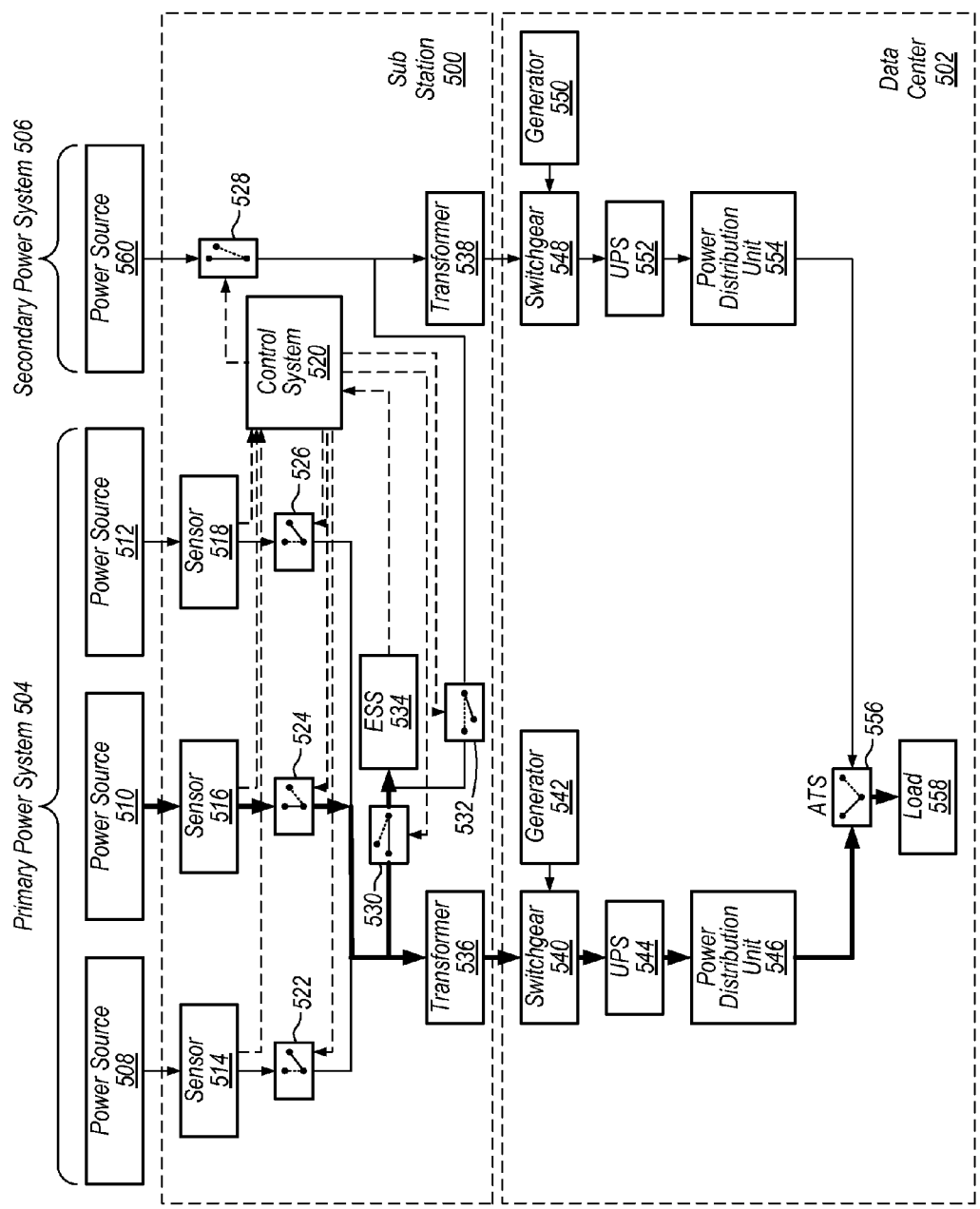
FIG. 5A-B are schematics illustrating a high-voltage energy storage system (ESS) coupled to a primary power system and a secondary power system via a switching device assembly comprising multiple switching devices which are configured to selectively isolate the high-voltage ESS device from either the primary power system or the secondary power system and to selectively provide high-voltage electrical power from the high-voltage ESS device to either the primary power system or the secondary power system while isolating the high-voltage ESS device from the alternate (either primary or secondary) power system, according to some embodiments.
Figure 5B:
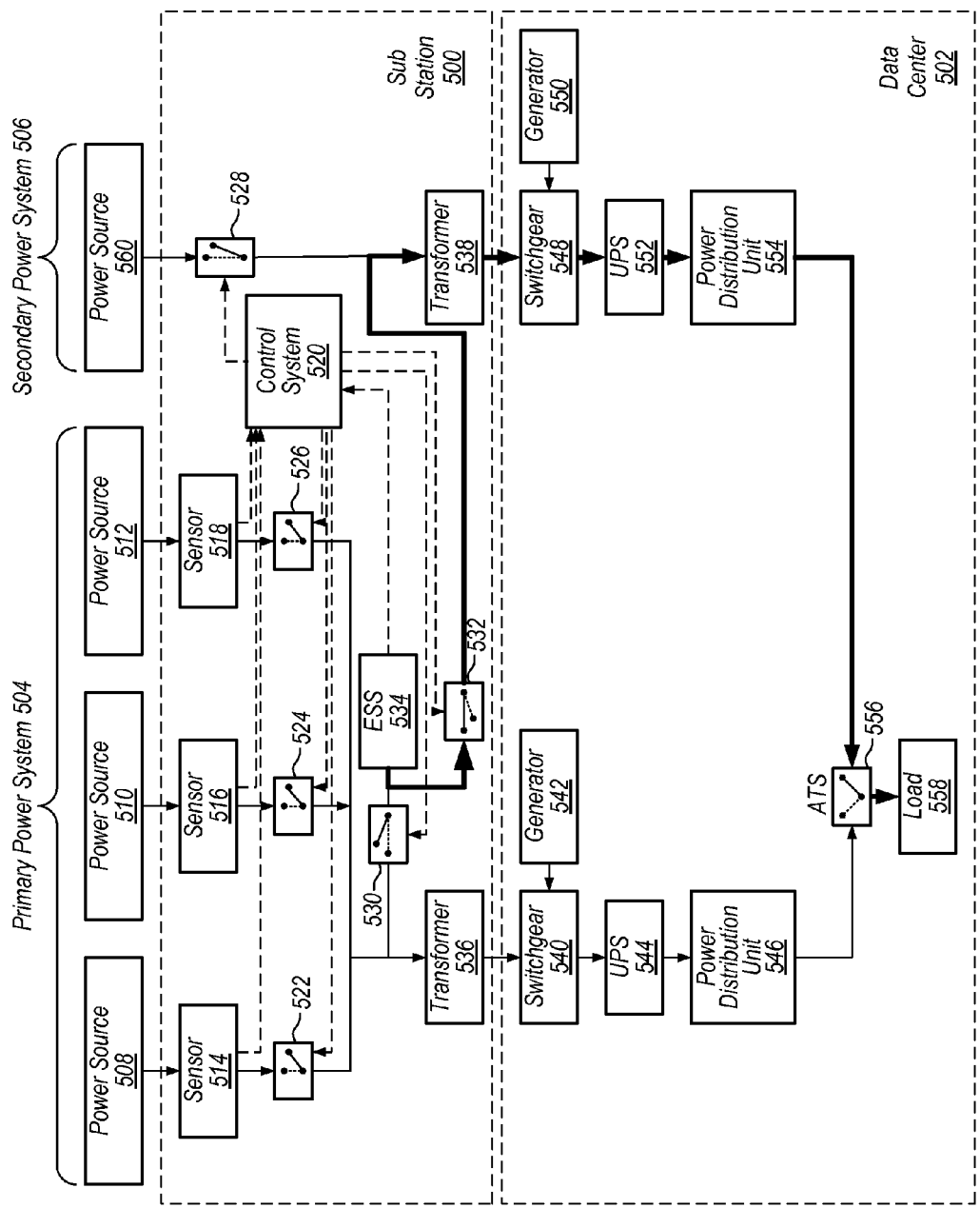

FIG. 5A-B are schematics illustrating a high-voltage energy storage system (ESS) coupled to a primary power system and a secondary power system via a switching device assembly comprising multiple switching devices which are configured to selectively isolate the high-voltage ESS device from either the primary power system or the secondary power system and to selectively provide high-voltage electrical power to either the primary power system or the secondary power system while isolating the high-voltage ESS device from the alternate (either primary or secondary) power system, according to some embodiments. In FIG. 5A high-voltage ESS device 534 is currently configured to provide backup power support to primary power system 504. Primary power system 504 and secondary power system 506 are configured to respectively provide primary power support and backup power support to load 558 in data center 502. Primary power system 504 and secondary power system 506 each comprise components in substation 500 and data center 502. In some embodiments, primary power system 504 and secondary power system 506 may comprise components in the same substation 500. In some embodiments primary power system 504 and secondary power system 506 may comprise components in separate substations 500.

In some embodiments, one or more of electrical substation 500, data center 502, and energy control system 520 are part of a common facility, are controlled by a common entity, or some combination thereof. For example, electrical substation 500, energy control system 520, and data center 502 may be located in the same facility and be part of a common entity distinct from a power utility entity.

Primary power system 504 receives high-voltage electrical power from power sources 508, 510, and 512. Sensor 514 measures characteristics of power from power source 508, sensor 516 measures characteristics of power from power source 510, and sensor 518 measures characteristic of power from power source 512. Sensors 514, 516, and 518 send sensor signals to energy control system 520 wherein the sensor signals are based on the power characteristics measured from each respective power source. Electrical power received from power sources 508, 510, and 512 is routed to switching device assemblies 522, 524, and 526. In the embodiment illustrated in FIG. 5A, Switching device assemblies 522 and 526 are open and switching device assembly 524 is closed. Since switching device assemblies 522 and 526 are open, electrical current does not flow from power sources 508 and 512 to load 558 in data center 502. Since switching device 524 is closed, electrical power flows from power source 510 to transformer 536 and to switching device assembly 530, which is coupled to the feed to transformer 536 and to high-voltage ESS device 534. Transformer 536 steps down the high-voltage electrical power received from power source 510 and feeds low-voltage electrical power to data center 502.

Switching device assembly 530 coupled to the feed from power source 508, 510, or 512 to transformer 536 selectively couples and isolates high-voltage ESS device 534 from the feed to transformer 536. In FIG. 5A switching device assembly 530 is closed and switching device assembly 532 is open. Closed switching device assembly 530 feeds a portion of the high-voltage electrical power being fed to transformer 536 to high-voltage ESS device 534. High-voltage ESS device 534 stores electrical power received via a connection to the feed to transformer 536. As discussed in more detail below, if power is not being fed to transformer 536 and the voltage in the feed to transformer 536 falls below the voltage in high-voltage ESS device 534, high-voltage ESS device 534 will provide high-voltage electrical power to the feed to transformer 536 via the same connection to the feed to transformer 536 through which high-voltage ESS device 534 receives electrical power. In FIG. 5A switching device 532 is open, resulting in the discharge from high-voltage ESS device 534 being isolated from secondary power system 506.

The configuration depicted in FIG. 5A can be considered "normal operations." The bold-faced line shows the flow of electrical power through substation 500 and data center 502 during normal operations, according to one embodiment. High-voltage electrical power is received from power source 510 and is fed to transformer 536 via switching device assembly 524. High-voltage electrical power is also fed to high-voltage ESS device 534 via switching device assemblies 524 and 530. High-voltage ESS device 534 stores high-voltage electrical power received from power source 510 via switching device assemblies 524 and 530. Switching device assembly 532 is open so that primary power system 504 is isolated from secondary power system 506 and high-voltage electrical power from high-voltage ESS device 534 does not flow to secondary power system 506. Transformer 536 steps down the high-voltage electrical power received from power source 510 and feeds low-voltage electrical power to switchgear 540 in data center 502. Switchgear 540 feeds the low-voltage electrical power received from transformer 536 to UPS 540 and is configured to alternatively feed low-voltage electrical power from generator 542 if power feed is lost from transformer 536. UPS 544 provides backup power support to power distribution unit 544 and load 558 in case of a short duration loss of power feed from switchgear 540. Low-voltage electrical power is fed from UPS 544 to power distribution unit 546 and distributed to one or more loads 558 in data center 502 via automatic transfer switch 556. Automatic transfer switch 556 preferentially feeds electrical power to loads 558 from primary power system 504. If power feed from primary power system 504 is lost, automatic transfer switch automatically switches to feed power to loads 558 from secondary power system 506.

In the configuration depicted in FIG. 5A secondary power system 506 provides reserve power support to loads 558 in data center 502. Power source 560 is electrically coupled to transformer 538 via switching device assembly 528 which is closed. Switching device assembly 532 is open, therefore isolating secondary power system 506 from primary power system 504. Transformer 538 is configured to step down high-voltage electrical power fed from power source 560 to low-voltage power that can be fed to switchgear 548 in data center 502. Switchgear 548 can route low-voltage electrical power from transformer 538 or from generator 550. UPS 552 and power distribution unit 554 function similarly to UPS 544 and power distribution unit 546 in primary power system 504. Low-voltage electrical power can be fed to loads 558 via UPS 552, power distribution unit 554 and automatic transfer switch 556. In FIG. 5A automatic transfer switch 556 is aligned to feed electrical power from primary power system 504 to loads 558. Automatic transfer switch 556 isolates loads 558 from secondary power system 506, so that as long as electrical power is fed to loads 558 from primary power system 504, electrical power does not flow from secondary power system 506 to loads 558. If power supply from primary power system 504 is lost, automatic transfer switch 556 is configured to automatically isolate primary power system 504 from loads 558 and couple secondary power system to loads 558 so that electrical power flows from secondary power system 506 to loads 558.

The configuration depicted in FIG. 5B can be considered a "non-normal" operation. Substation 500 and data center 502 may operate in non-normal operations in response to a loss of one or more of power sources 508, 510, 512, or 560. Substation 500 and data center 502 may operate in non-normal operations in response to determining a waveform associated with one or more of power sources 508, 510, 512, or 560 matches a waveform profile indicating a potential loss of power feed from a respective power source. Substation 500 and data center 502 may operate in non-normal operations in response to determining one or more costs associated with power from one or more of power sources 508, 510, 512, or 560 exceeds one or more cost thresholds. In some embodiments, substation 500 and data center 502 may operate in non-normal operations for other reasons.

Primary power system 504 and secondary power system 506 comprise the same components as depicted in FIG. 5A. However, in FIG. 5B loads 558 are fed electrical power from high-voltage ESS device 534 via secondary power system 506. Substation 500 and data center 502 may operate in this non-normal configuration in response to a loss of power feed from a power source and in response to an additional unplanned event taking place at the same time. For example, a failure in power distribution unit 546 may prevent primary power system 504 from feeding electrical power to loads 558 in data center 502. At the same time as the failure of power distribution unit 546, power feed from power source 560 may be lost. In response to not receiving power feed to secondary power system 506 and not being able to feed electrical power through primary power system 504, energy control system 520 may command a non-normal operation. FIG. 5B is an example of a non-normal operation and is not exhaustive of all possibilities in which a high-voltage ESS device in an electrical substation can be used to provide reserve power support. In some embodiments, other configurations may be used.

Power sources 508, 510, and 512 are configured to supply high-voltage electrical power to primary power system 504, but switching device assemblies 522, 524, and 526 are open so that no electrical power actually flows from power sources 508, 510 and 512 to primary power system 504. Switching devices 522, 524, and 526 may be commanded to remain open by energy control system 520 due to characteristics associated with power sources 508, 510, and 512 sensed by sensors 514, 516, and 518. For example, sensors 508, 510, and 512 may sense a loss of power supply from power sources 508, 510, and 512. Sensors 514, 516, and 518 may detect one or more waveform patterns and energy control system 520 may determine that the one or more waveform patterns match a waveform pattern indicating a potential loss of power feed from power sources 508, 510, and 512 and may proactively command switching devices 522, 524, and 526 to open to stop feeding electrical power from power sources 508, 510, and 512. Energy control system 520 may detect that power distribution unit 546 is not capable of distributing electrical power due to a failure of power distribution unit 546. In some embodiments, energy control system 520 may receive an indication from a user terminal that power distribution unit 546 has failed.

Energy control system 520 also commands switching device assembly 530 to open. This results in isolating the discharge of high-voltage ESS device 534 from primary power system 504 so that the high-voltage discharge from high-voltage ESS device 534 does not flow into primary power system 504. Since high-voltage ESS device 534 is isolated from primary power system 504 and power sources 508, 510, and 512 are isolated from primary power system 504 via open switching device assemblies 522, 524, and 526, electrical power is not fed to primary power system 504. Since primary power system 504 is not feeding electrical power, automatic transfer switch 556 automatically switches to feed electrical power to loads 558 from secondary power system 506.

In the "non-normal operation" depicted in FIG. 5B, power source 560 does not feed electrical power to secondary power system 506. The bold-faced line shows the flow of electrical power through substation 500 and data center 502 during non-normal operations, according to some embodiments. Switching device assembly 528 is open to isolate power source 560 from secondary power system 506. Power source 560 could not be feeding electrical power to secondary power system for similar reasons as why power sources 508, 510, and 512 are not feeding electrical power to primary power system 504 including a loss of electrical power supply to power source 560, a characteristic of the power in power source matching a waveform profile indicating a potential loss of power from power source 560, or for another reason. Switching device assembly 528 is commanded open by energy control system 520 in response to energy control system 520 determining not to feed electrical power to secondary power system 506 from power source 560.

Energy control system 520 commands switching device assembly 532 to close. This results in coupling the high-voltage discharge from high-voltage ESS device 534 to secondary power system 506. As discussed above, switching device assembly 530 is open so that the discharge from high-voltage ESS device 534 does not flow into primary power system 504. Also switching device assembly 528 is open so that the high-voltage discharge from high-voltage ESS device 534 does not back feed into power source 560. In some embodiments, the high-voltage discharge from high-voltage ESS device 534 may be routed to primary power system 504 by closing switching device assembly 530, opening switching device assembly 532 and opening switching device assemblies 522, 524, and 526. In some embodiments, the high-voltage discharge from high-voltage ESS device 534 may be routed to both primary power system 504 and secondary power system 506 based on closing switching device assemblies 530 and 532 and opening switching device assemblies 514, 516, 518, and 528.

In the configuration of switching device assemblies depicted in FIG. 5B, high-voltage power flows from high-voltage ESS device 534 via a discharge of high-voltage ESS device 534 coupled to closed switching device assembly 532 to transformer 538. Transformer 538 steps down the high-voltage discharge into a low-voltage power feed to data center 502. The low-voltage power feed is fed to switchgear 548. Switchgear 548 selectively feeds electrical power to UPS 552 from the low-voltage feed from transformer 538 or from generator 550. Energy control system 520 can command switchgear 548 to feed electrical power from transformer 538 or generator 550. UPS 552 feeds electrical power to loads 558 via power distribution unit 554 and automatic transfer switch 556, which is switched to feed electrical power to loads 558 from secondary power system 506.

In some embodiments, other arrangements of switching device assemblies may be used to selectively provide electrical power to loads in data center 502 from power sources 508, 510, 512, 560, and a high-voltage ESS device 534. In some embodiments, other thresholds may be used to decide to feed electrical power from a high-voltage ESS device 534 instead of from a power source.

Figure 6:
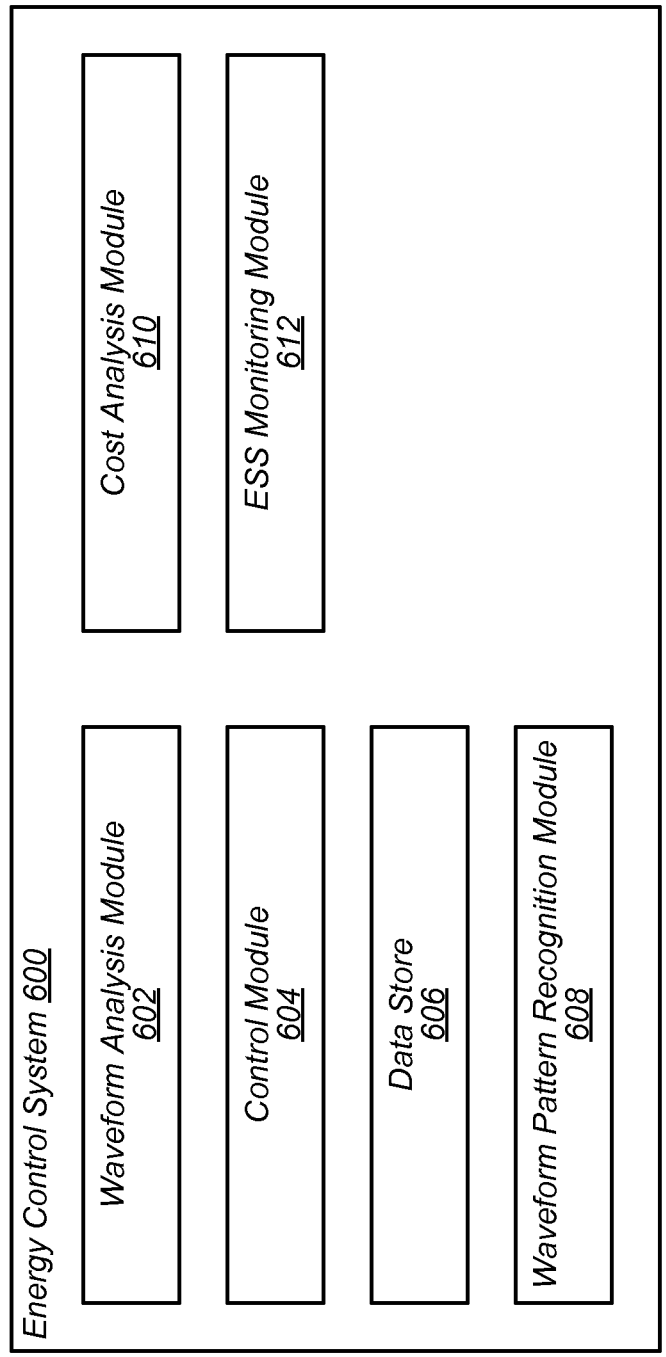
FIG. 6 is a schematic illustrating an energy control system which controls switching of a power system between one or more utility power feeds and a high-voltage energy storage system (ESS), according to some embodiments.

FIG. 6 illustrates one embodiment of an energy control system which controls switching between one or more utility power feeds and a high-voltage energy storage system (ESS). The energy control system described in FIG. 6 may be any of the energy control systems described in regards to FIGS. 1-5.

In some embodiments, energy control system 600 comprises one or more of a waveform analysis module 602, a control module 604, a data store 606, a waveform pattern recognition module 608, a cost analysis module 610, and an ESS monitoring module 612. Some or all of the modules included in energy control system 600 may be implemented by one or more components of one or more computing devices. In some embodiments, some or all of the modules in energy control system 600 are communicatively coupled to each other. Energy control system 600 may be coupled to one or more external systems through one or more communication connections. In some embodiments, individual modules within energy control system 600 include individual communication connections to one or more external systems.

Energy control system 600 manages power distribution in some or all of a power infrastructure, including, for example, some or all of the systems illustrated in FIG. 1-5. Power distribution management can include, in some embodiments, managing a supply of power to an electrical load. The electrical load may include a data center.

Energy control system 600 may determine the occurrence of a power event based on waveform monitoring performed by waveform pattern recognition module 608 and waveform analysis module 602 and cost reduction monitoring performed by cost analysis module 610 and ESS monitoring module 612.

In some embodiments, management by energy control system 600 of power supplied to a load includes monitoring a waveform of one or more high-voltage power feeds and selectively routing a high-voltage power feed, such that power is supplied to the load, based upon determinations made from the monitoring. In some embodiments, monitoring a waveform includes monitoring the waveform for one or more waveform patterns indicating one or more particular power events and, upon detecting a waveform pattern, determining that the one or more particular power events may occur in the power feed. In some embodiments, management by energy control system 600 of power supplied to a load includes monitoring one or more costs associated with respective power sources and selectively routing a high-voltage power feed, such that the power is supplied to the load from the power source that best meets one or more price thresholds, based on determinations made from the monitoring. Selectively routing a high-voltage power feed may include routing high-voltage electrical power from a high-voltage energy storage system (ESS), where the ESS device is configured to store high-voltage power and discharge high-voltage power based on a configuration of one or more switching device assemblies.

The energy control system 600 may monitor a waveform of a power feed based on data associated with the power feed. Such data may be received at the energy control system 600 from one or more sensor devices (not shown). In some embodiments, sensor devices from which data is received are located external to energy control system 600. For example, energy control system 600 may receive data associated with high-voltage power received over one or more power transmission lines from one or more sensor devices coupled to the power transmission lines. Data receipt may occur continuously, intermittently, periodically, or some combination thereof. Energy control system 600 may receive data over a network connection, where the data represents one or more costs associated with electrical power fed from one or more power sources to an electrical substation managed by energy control system 600. For example, energy control system may receive continuously updated prices for consumption of electrical power (i.e. price per kilowatt-hour) from one or more utility companies supplied electrical power to a substation or data center managed by energy control system 600.

In some embodiments, data associated with a power feed is received at energy control system 600 and processed by waveform analysis module 602 to monitor for one or more waveform patterns in a waveform of the power feed. A particular waveform pattern may be associated with a particular power event. For example, the presence of one waveform pattern may indicate normal variations in the power feed. Another waveform pattern may indicate, by its presence in the waveform, that the power feed is experiencing one or more particular disturbances. For example, a waveform pattern may indicate that the power feed is experiencing voltage sag. One or more disturbances may indicate that the power feed may be about to be interrupted, be sufficiently disrupted that the power feed may about to become unusable by an electrical load, etc. As a result, identifying a particular waveform pattern in a waveform of a power feed may indicate that the power feed may potentially be interrupted or otherwise unusable by a load.

Particular power events may represent particular events associated with a power feed, including normal operation, certain specific disturbances in performance, power surges, brief interruptions, total loss of the power feed, etc. For example, the waveform analysis module 602 may determine, based on detection of one or more particular waveform patterns in a waveform of a power feed, that the power is unstable and may potentially fail or otherwise become unusable by a load.

In some embodiments, waveform patterns are a function of one or more characteristics of a waveform. Characteristics can include a rate of change in voltage over time, a rate of change in current over time, frequency of voltage or current, magnitude, slope of variation, some combination thereof, etc. For example, a particular waveform pattern may be identified by a reduced waveform magnitude as a variation of time, a tabled magnitude, etc. Particular waveform patterns may be associated with particular power events associated with a power feed, such that occurrence of the power event in a power feed may be anticipated by identifying an associated waveform pattern in a waveform of the power feed.

Determinations that power events may potentially occur in a power feed may have varying levels of confidence based upon one or more of the particular waveform pattern detected, a correlation between the monitored waveform and the particular waveform pattern, the particular power event associated with the particular waveform pattern, a confidence level of the association between the particular waveform pattern and the particular power event, some combination thereof, or the like. Such levels of confidence may influence decisions made regarding power management.

Control module 604 interacts with various external components to manage power distribution in a power infrastructure. Such interactions can include controlling one or more switching devices, activating one or more backup power sources, etc. In some embodiments, control module 604 receives data associated with various components that is used to determine commands directed by the control module 604 to external systems. For example, where an external backup power source in the power infrastructure includes a diesel generator, control module 604 may receive data from the generator indicating how much diesel fuel is available in the generator's fuel tanks.

In some embodiments, control module 604 interacts with waveform analysis module 602. Upon a determination by waveform analysis module 602 that a particular power event may occur in a power feed, control module 604 may direct one or more components to selectively route one or more power feeds. The components may be external to energy control system 600. For example, where high-voltage power received over a first power transmission line is being routed to a load in a power infrastructure, and waveform analysis module 602, in the course of monitoring a waveform of the high-voltage power, detects a particular waveform pattern indicating a particular power event, control module 604 may direct a high-voltage switching device to switch from routing high-voltage power from the first power transmission line to routing high-voltage power from a second power transmission line. Control module 604 may direct a high-voltage switching device to switch from routing high-voltage power from the first power transmission line to routing high-voltage power from a high-voltage ESS device located in a substation or in a data center.

In some embodiments, waveform analysis module 602 may continuously monitor waveforms of some or all power feeds received at an electrical substation, and control module 604 may continuously direct at least a part of the electrical substation to selectively route one or more of the power feeds based upon determinations made by the waveform analysis module 602 based on the monitoring. For example, control module 604 may direct a part of an electrical substation to switch between routing a first power feed to routing a second power feed in response to determining that a quality of power received over the second power feed is higher than power received over the second power feed.

Continuing the example, control module 604 may direct a part of an electrical substation to switch between routing the first power feed to routing a third power feed in response to the waveform analysis module 602 detecting a waveform pattern indicating a first power event in the waveform of the first power feed and concurrently or previously detecting a second power event in the waveform of the second power feed. Subsequently, control module 604 may direct a part of the electrical substation to switch between routing the third power feed to routing the first power feed in response to the waveform analysis module 602 detecting a third waveform pattern in the waveform of the first power feed. In another example, control module 604 may direct a part of an electrical substation to switch between routing a first power feed to routing a power feed from a high-voltage ESS device in response to determining an acceptable power feed from an external power source is not available.

In some embodiments, energy control system 600 responds to determining that a power event may potentially occur in a power feed received at an electrical substation by selectively routing one or more power feeds to a transformer. For example, where a first power feed is being routed to a transformer by a switching device, and waveform analysis module 602 detects a waveform pattern in a waveform of the first power feed, the waveform analysis module 602 may respond to the detection by determining that a first power event may potentially occur in the first power feed with a certain level of confidence and control module 604 may, in response to the determination, direct the switching device to switch from the first power feed to a second power feed, such that the second power feed is routed to a transformer and the first power feed is isolated from a transformer.

In some embodiments, the energy control system 600 takes different actions based upon different confidence levels of a determination. For example, where the waveform analysis module 602 determines, with an 80% level of confidence, that a first power event may potentially occur in a first power feed, the control module 604 may direct a switching device to switch to another power feed. In another example, where the waveform analysis module 602 determines that a first power event may potentially occur in a first power feed with only a 30% confidence, the control module 604 may choose to continue routing the first power feed. In some embodiments, a confidence threshold, which may be predetermined, adaptively developed over time, or some combination thereof may influence, in part or in full, which action is directed by the control module 604. For example, a confidence level associated with a determination of a particular power event based on detection of a particular waveform pattern may be predetermined to be 60%. In another example, the confidence level may be adaptively created, adjusted, or some combination thereof by the energy control system 600 over time based upon observations by the waveform analysis module 602 of occurrences of power events in one or more power feeds and detection of waveform patterns in a waveform of one or more of the power feeds.

In some embodiments, one or more of the power feeds are ranked in terms of preference, such that the control module 604 may direct one or more components to preferentially selectively route the highest-ranking stable power feed. In some embodiments power feeds from external power sources may be ranked along with a power feed from a high-voltage ESS device in an electrical substation based on one or more costs in addition to basing the rankings on stability of the power sources. For example, control module 604 may direct a part of an electrical substation to switch between routing a first power feed to routing a third power feed in response to waveform analysis module 602 detecting a waveform pattern indicating a first power event in the waveform of the first power feed, where the third power feed is a higher-ranking power feed than a second power feed. Rankings may be predetermined. In some embodiments, rankings of power feeds are developed and revised continuously, intermittently, periodically, etc., such that a highest-ranking power feed may change over time based upon monitoring of the power feeds by waveform analysis module 602 and cost analysis module 610. In some embodiments, rankings of power feeds may be determined by one or more modules of energy control system 600. For example, control module 604 may determine a highest-ranking power feed based upon waveform monitoring of multiple power feeds conducted by waveform analysis module 602, cost analysis module 610, and ESS monitoring module 612.

In some embodiments, energy control system 600 includes a waveform pattern recognition module 608 that interacts with waveform analysis module 602, data store 606 and one or more other systems to adaptively develop the ability to identify or anticipate disturbances in a power feed over time. Various machine-learning techniques may be applied, at least in part by waveform pattern recognition module 608 to develop the ability to learn to identify or anticipate various disturbances over time. Waveform pattern recognition module 608 may correlate waveform patterns detected by the waveform analysis module 602 with corresponding power events observed by energy control system 600 or some external system to create associations between detected waveform patterns and observed power events for future power management. Power events may be determined to be corresponding to a waveform pattern based upon a determined relationship between the power event and the waveform pattern, including time proximity of occurrences of a threshold number of the power event and the waveform pattern.

For example, waveform analysis module 602 may detect a previously-unknown waveform pattern in a waveform of a high-voltage power feed and, shortly thereafter, detect that the high-voltage power feed is interrupted. The waveform analysis module 602 may respond to detecting an unknown waveform pattern by storing the unknown waveform pattern. The waveform pattern recognition module 608 may respond to one or more occurrences of the unknown waveform pattern and the power interruption event by associating the unknown waveform pattern with the power interruption event such that, upon detecting the waveform pattern in the future, the waveform analysis module 602 may determine that the power interruption event may potentially occur.

In some embodiments, upon determining an association of a waveform pattern with a power event, a portion of energy control system 600 may establish pattern identification data associated with the waveform pattern. Such establishment may be performed by one or more modules in energy control system 600. Pattern identification data including information identifying associations between known power events and known waveform patterns may be utilized by the waveform analysis module 602 to identify waveform patterns and determine the potential occurrence of power events in a power feed. In some embodiments, the information may include characteristic information associated with a known waveform pattern that identifies the associated one or more power events, such that the waveform analysis module 602 compares a monitored waveform with characteristics of one or more known waveforms and, upon determining a correlation between the monitored waveform and a known waveform pattern based on the characteristics, determines the potential occurrence of an associated power event. In some embodiments, the information may include one or more algorithms utilized by the waveform analysis module to process a waveform, such that, if a certain result of processing the waveform with the algorithm occurs, the potential occurrence or non-occurrence of a particular associated power event is determined.

In some embodiments, various particular waveform patterns may be associated with a common power event. For example, the waveform pattern recognition module 608 may associate several similar but slightly differing waveform patterns with a single power event. The waveform pattern recognition module 608 may, in response to determining that multiple known waveform patterns are associated with a common power event, determine a similarity between the waveform patterns. If two or more of the known waveform patterns are determined to correlate within a certain predetermined threshold, the waveform pattern recognition module 608 may establish standardized pattern identification data for a standardized version of the waveform patterns, such that processing the two or more waveforms with the standardized pattern identification data would result in identification of the standardized waveform pattern. The pattern identification data associated with the two or more known waveform patterns can be removed from use by the waveform analysis module 602 in detecting waveform patterns, deleted, or some combination thereof. In this way, the waveform analysis module 602 can process a waveform with fewer sets of pattern identification data, thereby enhancing effectiveness and efficiency of energy control system 600.

In some embodiments, data store 606 may store information related to various modules in energy control system 600. For example, data store 606 may store associations between known waveform patterns and known power events. Data store 606 may store pattern identification data associated with known waveform patterns. Data store 606 may store cost information associated with one or more power sources fed to a substation managed by energy control system 600. In some embodiments, information stored at data store 606 is received from an external source. For example, data store 606 may store received data associated with various external components, predetermined data supplied by a user to energy control system through a user interface, or the like.

In some embodiments, data associated with a power feed is received at energy control system 600 and processed by cost analysis module 610 to perform cost reduction monitoring of costs associated with receiving electrical power from one or more power sources. For example, a utility power provider may charge a fee for the amount of power consumed (i.e. kilowatt-hours) and for the highest flow of power (i.e. a demand charge—peak kilowatts recorded in a time increment). The fees charged by the utility power provider may change on a frequent basis. Current pricing may be stored in data store 606 and cost analysis module 610 may utilize the stored current pricing and information from control module 604 relating to the current flow of power from individual power sources to calculate a current cost associated with receiving electrical power from a particular utility power provider. The current pricing stored in data store 606 may include electrical market data representing costs of electrical power from multiple utility power providers. Data store 606 may receive periodic updates regarding the electrical market data. For example, data store 606 may receive hourly or daily updates regarding electrical market data via a network connection. In some embodiments, the periodic updates may be more or less frequent. Cost analysis module 610 may compare the current cost associated with receiving electrical power from a particular power provider to one or more cost thresholds. In response to determining the current costs associated with receiving electrical power from a particular utility power provider exceeds one or more of the cost thresholds, cost analysis module 610 may communicate with control module 604. Control module 604 may command one or more switching device assemblies to route electrical power from an alternate power source including routing electrical power from a high-voltage ESS device in response to the costs associated with receiving electrical power from the particular utility power provider exceeding the one or more thresholds.

In some embodiments, data store 606 may store seasonal costs, where a utility power provider charges different rates for different periods of a year. For example, a utility power provider may charge a higher rate for electrical power during summer months than during winter months. In some embodiments, data store 606 may store historical pricing for different parts of a day. For example, a utility power provider may vary the rate charged for electrical power based on demand in a certain location. The demand in the location may follow certain patterns such that the demand during a certain part of the day and therefore the price of electrical power during a certain part of the day can be predicted based on historical pricing patterns for different parts of a day. In some embodiments, cost analysis module 610 may determine a current cost associated with receiving electrical power from a particular utility power provider based on costs stored in data store 606 that were generated based on seasonal pricing and historical pricing during a day for a given location.

Energy control system 600 may include an ESS monitoring module 612. ESS monitoring module 612 may monitor the charge remaining in one or more high-voltage ESS devices managed by energy control system 600. ESS monitoring module 612 may communicate with control module 604. For example, ESS monitoring module 612 may monitor the charge of a high-voltage ESS device that is currently feeding electrical power to a load in a data center in response to a command from control module 604 based on a determination by cost analysis module 610 that the current cost with feeding electrical power to the load in the data center exceeds a threshold. ESS monitoring module 612 may monitor the current charge of the high-voltage ESS device that is currently feeding electrical power to the loads in the data center and notify control module 604 if the charge remaining in the high-voltage ESS device falls below a threshold, for example 30% charge remaining. In response to the notification that the charge remaining in the high-voltage ESS device is below the threshold, control module 604 may command to discontinue feeding electrical power from the high-voltage ESS device and to feed electrical power from a utility power provider even though the costs associated with receiving electrical power from the utility power provider exceed the one or more thresholds.

In another example, a data center may be configured with a high-voltage ESS device in a primary power system but without an uninterruptible power supply in the primary power system. The primary power system may also include a generator. In response to a loss of power feed from a utility power source, the primary power system may be fed by a high-voltage ESS device. ESS monitoring module 612 may monitor the charge remaining in the high-voltage ESS device and notify control module 604 if the charge remaining falls below a threshold charge remaining (e.g. 30% charge remaining). In response to receiving the notification from ESS monitoring module 612, control module 604 may command the generator in the primary power system to begin providing electrical power to loads in the primary power system and one or more switching devices to selectively route electrical power to the loads from the generator instead of from the high-voltage ESS device. The remaining 30% charge in the high-voltage ESS device may be conserved to provide electrical power for future short term interruptions in the power feed to the loads in the primary power system.

Figure 7A:
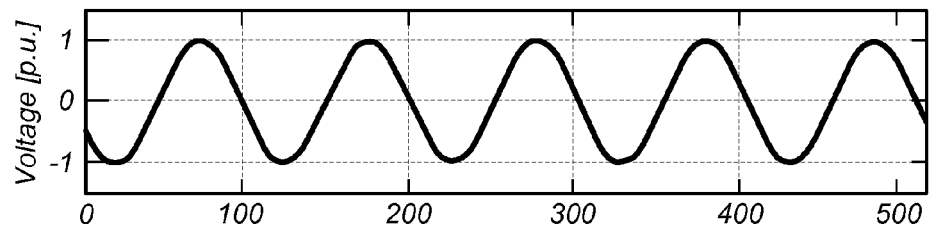
FIG. 7A, FIG. 7B, and FIG. 7C are graphs illustrating power waveforms associated with various power events, according to some embodiments.
Figure 7B:
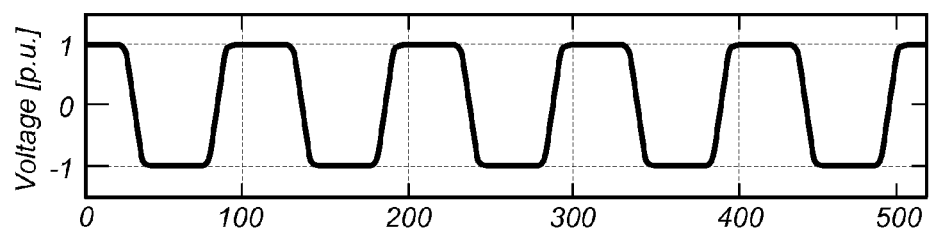
Figure 7C:
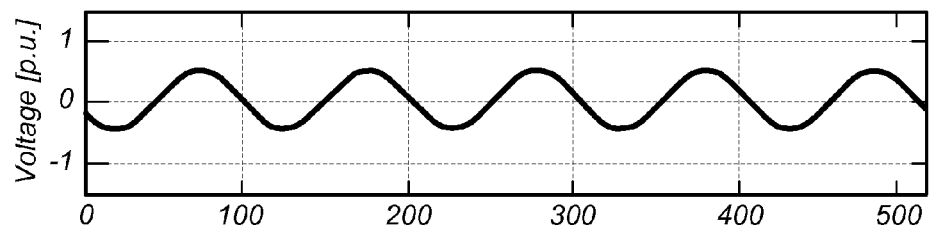

FIG. 7A, FIG. 7B, and FIG. 7C are graphs illustrating power waveforms associated with various power events in a power feed according to one embodiment. A portion of an energy control system, including a waveform analysis module, may monitor a waveform of a power feed to identify one or more waveform patterns, where a waveform pattern may indicate a level of quality of the power feed, whether one or more power events may potentially occur in the power feed, etc. The waveform analysis module may, in some embodiments, identify a waveform pattern in the waveform by comparing the waveform to characteristics of one or more known waveform patterns. In some embodiments, the waveform analysis module may identify a waveform pattern in the waveform by processing the waveform using pattern identification data, an algorithm, etc. such that a certain result of the processing indicates whether a power event may potentially occur in the power feed.

It will be appreciated that the illustrated power waveforms are examples of monitored waveforms, and that monitoring waveforms with different characteristics is encompassed by the present disclosure. For example, a waveform pattern may include transitory, non-repeating characteristics. In other examples, waveforms with varying magnitudes, frequencies, and other characteristics may be monitored.

FIG. 7A illustrates an example of a waveform of a high-voltage power feed that may be monitored under normal operating conditions according to one embodiment. The illustrated waveform is a sine wave of voltage over time consistent with normal operation of the power feed. It will be appreciated that in some embodiments a waveform involving variation of current over time may be monitored. A waveform analysis module, upon receiving data associated with the power feed, may process the illustrated waveform and determine that the power feed is operating normally. Normal operation may be determined by identifying a waveform pattern indicating normal power feed operation. The pattern may be identified by processing the waveform with a particular pattern identification data, algorithm, or the like that indicates normal operation based on a certain result of the processing. For example, where a pattern identification data includes a particular algorithm, and processing the waveform using the algorithm produces a certain resultant number, the value of the number may determine normal operation by being within a certain value range.

FIG. 7B and FIG. 7C illustrate examples of a waveform of a high-voltage power feed under disturbed operating conditions according to one embodiment. The waveform of FIG. 7B indicates harmonics and the waveform of FIG. 7C indicates voltage sag. Either waveform pattern may indicate, by its presence, that power quality in the power feed is degraded, destabilized, etc. In some embodiments, presence of the illustrated waveforms of a power feed may indicate that the power feed may potentially be interrupted in the future. Identification of either waveform pattern, and determination of what power event may potentially occur, may involve comparing the waveforms with known harmonics or voltage sag waveform patterns and, upon determining a correlation, identifying one or more power events associated with the correlating waveform pattern. In some embodiments, identification may involve processing the waveforms with algorithms or pattern identification data associated with one or more waveform patterns such that a resultant of the processing that falls within a certain range indicates that the waveform includes a certain waveform pattern associated with a certain one or more power events.

Figure 8:
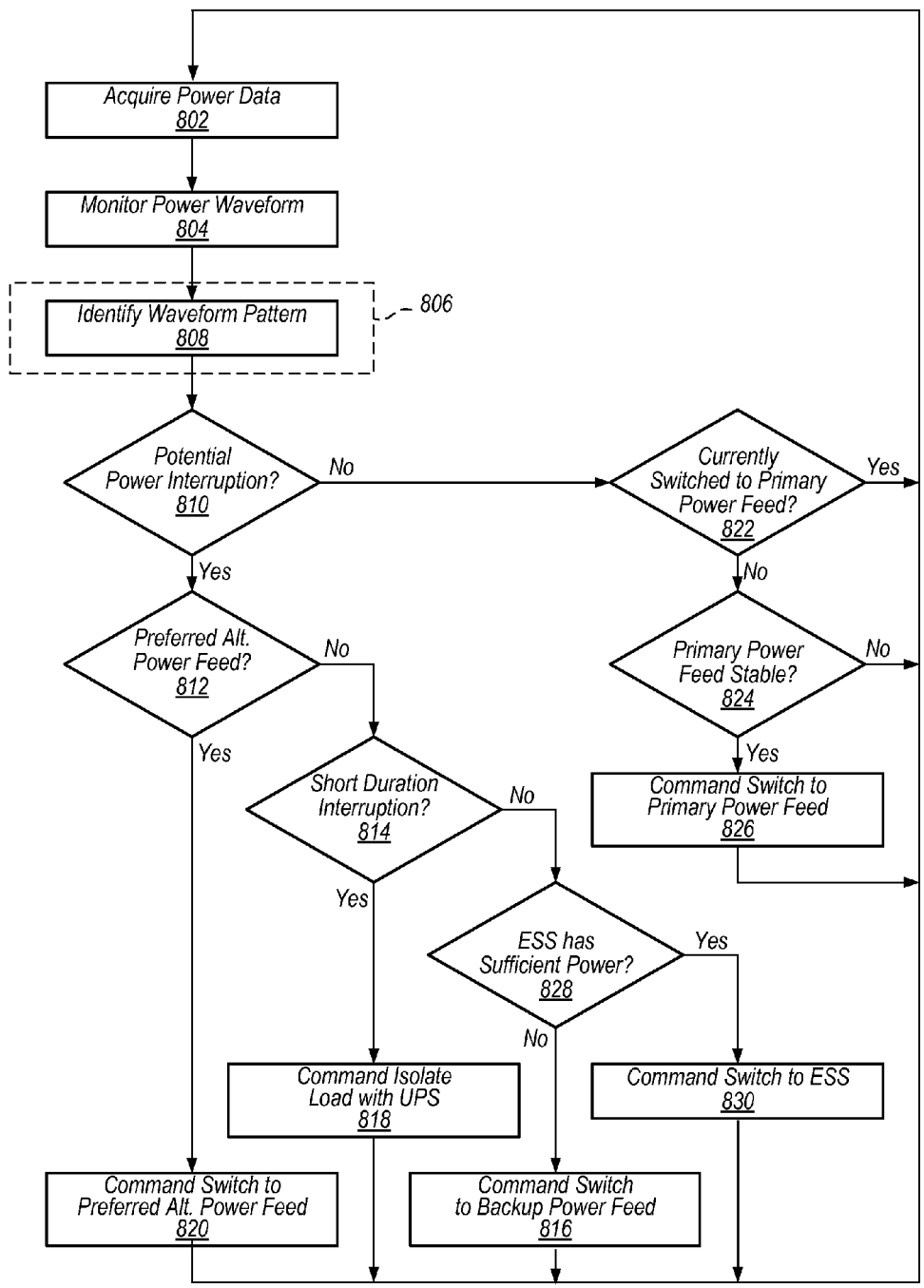
FIG. 8 illustrates managing power feeds supplied to a load including a feed from a high-voltage energy storage system (ESS), according to some embodiments.

FIG. 8 illustrates managing power feeds 800 supplied to a load in a data center including a feed from a high-voltage energy storage system (ESS), according to some embodiments. In some embodiments, the power feeds are managed by some or all of an energy control system.

At 802, power data associated with one or more power feeds is acquired. In some embodiments, not all of the power feeds are currently supplied to the load. For example, only one of the power feeds may be supplied to the load, while the other power feeds are isolated from the load. Acquiring power data includes acquiring the charge remaining in one or more high-voltage ESS devices managed by the energy control system. In some embodiments, acquiring power data includes acquiring information regarding the amount of fuel available for use by one or more generators managed by the energy control system.

At 804, the power data is used to monitor a waveform of one or more of the power feeds. In some embodiments, each power feed has a distinct and separate waveform, and each waveform of each power feed is monitored separately. The waveforms of each power feed can be monitored in parallel, in series, or some combination thereof.

At 806 and 808, a waveform pattern is identified in one or more of the waveforms of the one or more power feeds being supplied to the load. In some embodiments, waveform patterns in waveforms of power feeds being isolated from the load are identified.

At 810, a determination is made whether the identified waveform pattern indicates a potential interruption of power in the one or more power feeds being supplied to the load. If not, and the power feeds supplying power to the load include a designated primary power feed, as shown at 822, then the monitoring of power waveforms continues. If not, and the power feeds supplying power to the load do not include a designated primary power feed, and such a power feed is determined to be unstable, as shown at 822 and 824, then the monitoring of power waveforms continues.

If, at 810, 822, 824, and 826, the identified waveform pattern is determined to not indicate a potential interruption of power in the one or more power feeds being supplied to the load, and the power feeds do not include a designated primary power feed, but such a power feed is determined to be stable, then the supply of power to the load is switched to at least include the designated primary power feed.

In some embodiments, stability of a power feed can be determined based upon detection of one or more certain waveform patterns in a waveform of the power feed, where the certain waveform patterns indicate power feed instability, interruption, or the like. In some embodiments, designation of a power feed can be based upon a predetermined ranking of the power feeds, a developed ranking of the power feeds based upon monitored power quality of the feeds, or some combination thereof.

If, at 812 and 820, the identified waveform pattern indicates a potential interruption of power in the one or more power feeds being supplied to the load, then, if a preferred alternative power feed is available, the supply of power to the load is switched to at least include the preferred alternative power feed.

A designation of a preferred alternative power feed may be determined based on various factors. In some embodiments, such a designation is based on one or more of a ranking of power feeds and current availability and stability of the power feed. For example, if a highest-ranked power feed of five ranked power feeds is supplied to a load, a waveform pattern identified in a waveform of the highest-ranked power feed indicates a potential interruption of the feed, and the next three highest-ranked power feeds are unavailable but the last-ranked power feed is available and stable, then the last-ranked power feed may be designated the preferred alternative power feed and switched to supply power to the load. In some embodiments, the ranking of power feeds may include one or more power feeds from a high-voltage ESS device that stores high-voltage power.

At 812, 814, and 818, if no preferred alternative feeds are available, and the duration of the potential interruption of power is determined to be short, then the load may be isolated such that power is supplied to the load by a UPS. If, at 812, 814, 828, and 816, no preferred alternative feeds are available, the duration of the potential interruption of power is determined to be long, and a high-voltage ESS device in the system is determined to not have sufficient charge to provide a reliable power feed to the load, then the supply of power to the load is switched to at least include a backup power feed. In some embodiments, a backup power feed includes a power feed supplied by a generator. If, at 812, 814, 828, and 830, no preferred alternative feeds are available, the duration of the potential interruption of power is determined to be long, and a high-voltage ESS device in the system is determined to have sufficient charge to provide a reliable power feed to the load, then the supply of power to the load is switched to at least include a high-voltage discharge from a high-voltage ESS device.

In some embodiments where both a UPS and another backup power source are available to supply power to a load, the duration of a potential interruption of a power feed to the load may determine whether the UPS or backup power source is selected to supply power to the load. In some embodiments, a determination of whether an interruption duration is "long" or "short" may be determined based upon one or more of an available capacity of the UPS, the anticipated power consumption by the load during the anticipated length of the interruption, and the portion of the available capacity that would be expended to satisfy the anticipated power consumption. Interruption duration may be determined to be "long" or "short", and thereby determining whether the UPS or backup power source is utilized to provide power to the load, based upon whether the portion of available UPS capacity that would be exhausted to meet anticipated consumption during the interruption meets or exceeds a predetermined threshold. For example, if the predetermined threshold is 70%, the duration may be determined to be short, and the load powered by the UPS, only if the anticipated power consumption by the load during the anticipated interruption length would exhaust no more than 70% of the available capacity of the UPS.

In some embodiments, no further action is commanded in response to identifying a potential power interruption. For example, if, at 814, a duration of the potential interruption of power is determined to be short, then no action may be taken, such that a UPS may automatically provide power to the load upon occurrence of the power interruption without requiring commanding isolation of the load.

Figure 9:
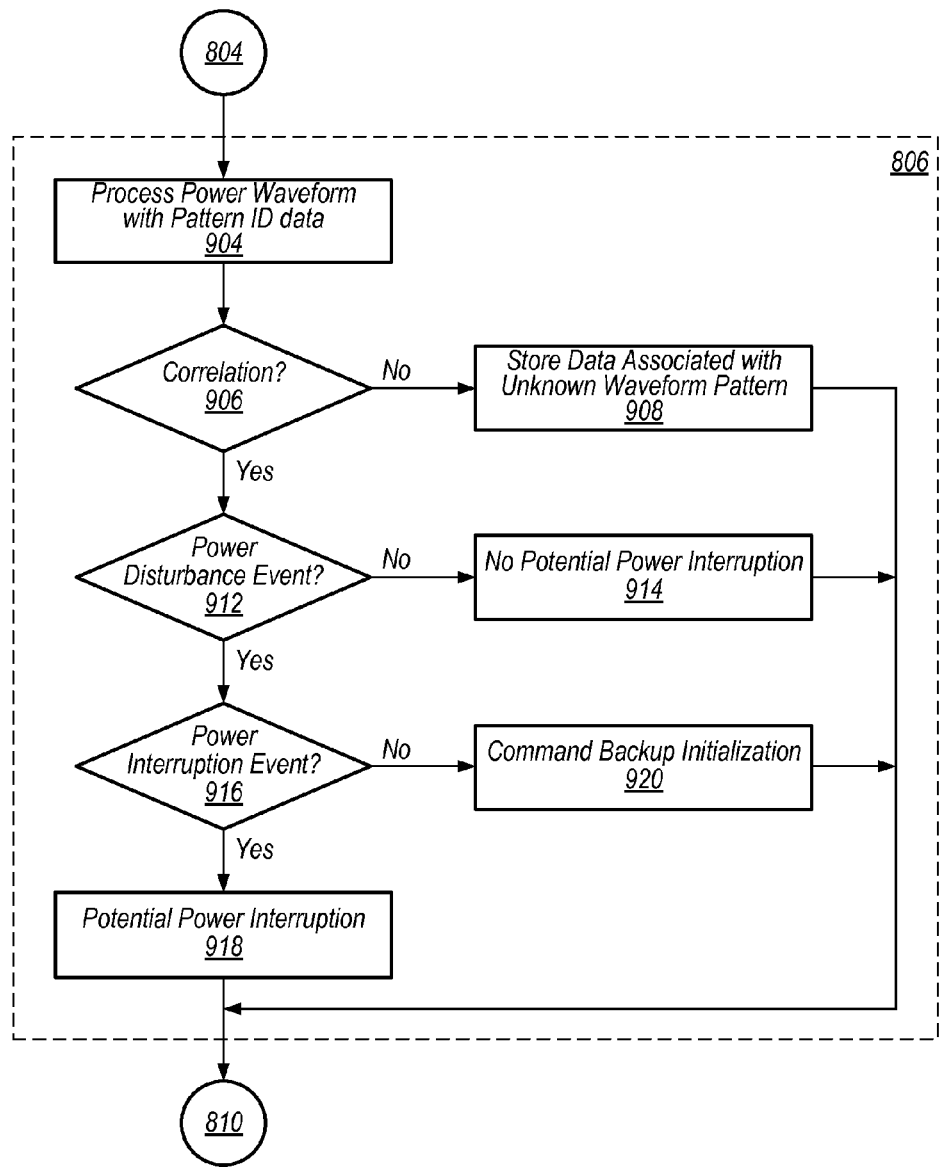
FIG. 9 illustrates identifying a waveform pattern in a power waveform, according to some embodiments.

FIG. 9 illustrates identifying 806 a waveform pattern in a power waveform according to one embodiment. The identification 806 of a waveform pattern illustrated in FIG. 9 encompasses the identification of a waveform pattern 808 as illustrated in FIG. 8 following 804 and preceding 810.

At 904, the power waveform of one or more power feeds is processed with one or more sets of pattern identification data. In some embodiments, each set of pattern identification data is used to detect one or more certain waveform patterns by processing the power waveform using the data. The pattern identification data may include one or more algorithms, one or more variable values to be used in a waveform processing algorithm, or some combination thereof. For example, a waveform may be processed using first, second, and third sets of pattern identification data, where each set corresponds to a separate first, second, or third waveform pattern and includes distinct variables for a general waveform processing algorithm and a known range of resultant values indicating presence of the respective waveform pattern. The power waveform may be processed by the general waveform algorithm three times, each time using variable values from one of the sets of pattern identification data, and each resultant may be compared against a corresponding resultant range for the set of pattern identification data, such that if the resultant falls within the range, the corresponding waveform pattern for the set of pattern identification data may be present in the power waveform. In another example, each set of pattern identification data may include a distinct resultant value range for a general waveform algorithm, such that a resultant of the general waveform algorithm indicates a particular waveform pattern and associated one or more power events if the resultant is within the distinct resultant value range.

The pattern identification data may include an indication of one or more power events associated with the certain waveform pattern, such that presence of the waveform pattern in the waveform indicates potential occurrence of the one or more power events.

In some embodiments, the pattern identification data includes characteristics of a waveform pattern, such that processing a waveform with the pattern identification data involves comparing characteristics of the waveform to determine if a correlation exists within a certain predetermined level of confidence.

At 906 and 908, if the power waveform does not correlate with any of the sets of pattern identification data, data associated with the unknown waveform pattern is stored. In some embodiments, the data is used to associate the unknown waveform pattern with a power event. For example, where a waveform does not correlate with known waveform patterns indicating normal operations, disturbances, interruptions, or some combination thereof, the waveform pattern may be preserved for future association by a waveform pattern recognition module with a power event.

At 906, 912, and 914, if the power waveform correlates with at least one known waveform pattern, and the known waveform pattern indicates a power event that is not a power disturbance event, then no potential power interruption is detected. For example, a known waveform pattern may be associated with normal power feed operations, such that correlation of a waveform with the known waveform pattern indicates normal power feed operations.

At 912, 916, and 920, if the power waveform correlates with at least one known waveform pattern that indicates a power disturbance event in the power feed, but the power disturbance event is not a power interruption event, then a backup power source is initialized and placed in a standby state for a predetermined period of time. In some embodiments, a power disturbance event indicates that a power feed is disturbed from normal operations, but may not potentially be interrupted. For example, a power event indicating a power feed fluctuation caused by a lighting strike may be interpreted as a power disturbance event that is not a power interruption event. In some embodiments, a backup power source may be activated in response to a power disturbance event to provide a ready source of backup power in the event that a waveform pattern indicating a power interruption event is identified in the power feed within the predetermined period of time. For example, if a waveform pattern indicating an intermittent fault is identified, a backup power source may be activated. After an elapse of the predetermined period of time, the backup power source may be deactivated in response to determining that the power feed is not at risk of a potential interruption. In some embodiments, a high-voltage ESS device may be the backup power source and initializing the high-voltage ESS device includes determining the high-voltage ESS device has a sufficient charge of electrical power remaining to feed electrical power in case a backup power source is needed. If a high-voltage ESS device is determined to have sufficient charge, the high-voltage ESS device may be used as the backup power source and one or more generators in the system will not need to be readied.

At 916 and 918, if the power waveform correlates with a power disturbance event that is a power interruption event, a potential power interruption in the power feed is determined.

Figure 10:
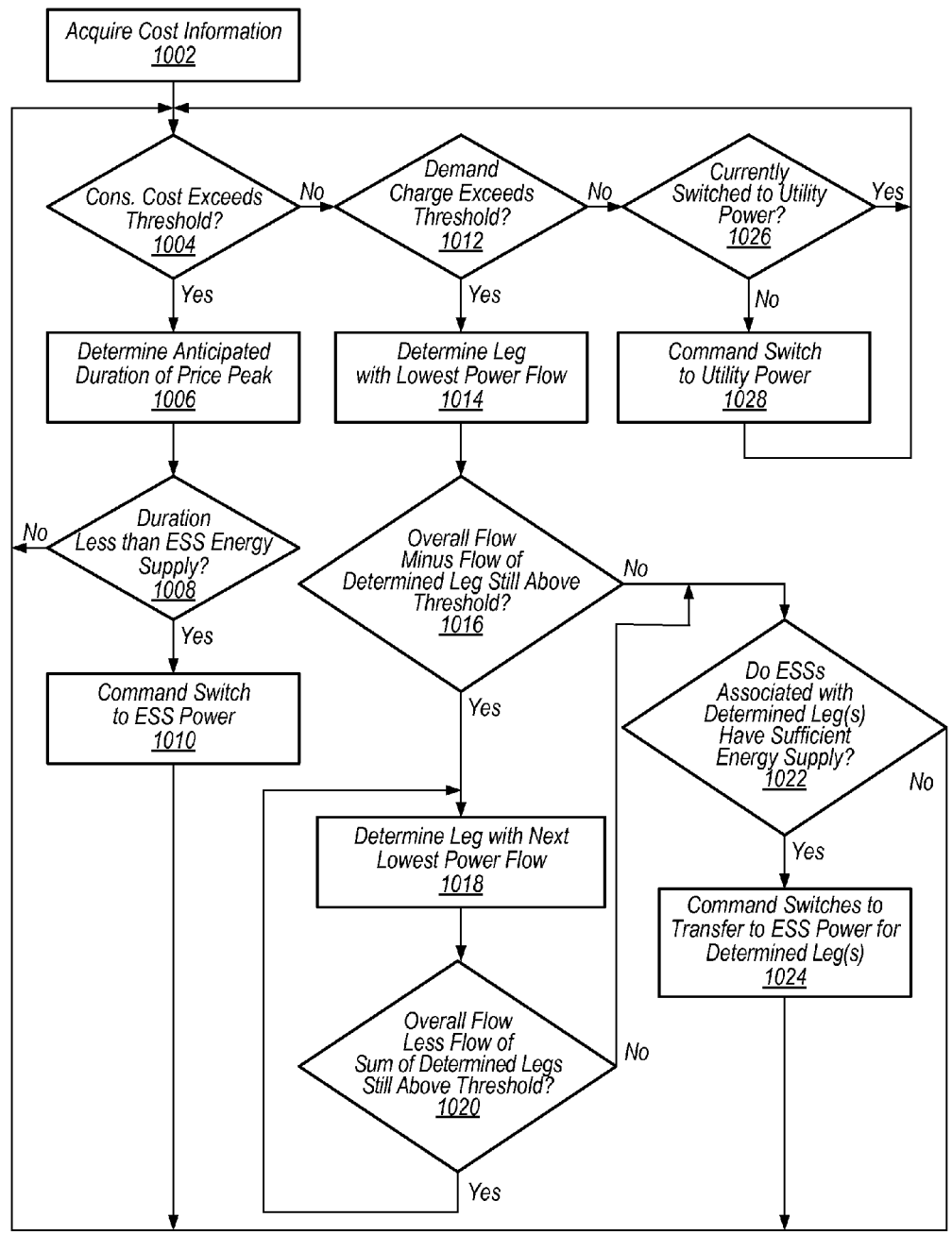
FIG. 10 illustrates managing power feeds supplied to a load including a feed from a high-voltage energy storage system (ESS), according to some embodiments.

FIG. 10 illustrates managing power feeds supplied to a load including a feed from a high-voltage energy storage system (ESS), according to some embodiments.

At 1002, costs associated with one or more power feeds are acquired. In some embodiments, not all of the power feeds are currently supplied to the load. For example, only one of the power feeds may be supplied to the load, while the other power feeds are isolated from the load. Acquiring costs includes acquiring a current consumption cost (price per kilowatt-hour) associated with respective power sources and a current demand charge (price based on peak flow in kilowatts). In some embodiments, acquiring power data includes acquiring information regarding the amount of charge remaining in one or more high-voltage ESS devices within the power systems.

At 1004, the energy control system may determine the occurrence of a power event based on the current consumption cost (price per kilowatt-hour) of electrical power from the available power sources exceeding a threshold. At 1006, if the current consumption costs exceed the threshold, the energy control system determines the anticipated duration of the peak pricing. Determining the anticipated duration of the peak pricing may include using historical data to determine the historical prices during a day and predicting at what time during the day the price of electricity from the utility power provider will fall to a level such that the threshold is not exceeded. For example, a price of consuming electricity may historically peak in the afternoon during the hottest part of the day. The energy control system may use historical peak pricing during hottest parts of days to determine an anticipated time when the pricing will reduce to a level such that the costs associated with feeding electrical power from the utility power provider does not exceed the threshold.

At 1004, 1006, and 1008, in response to determining that the consumption costs based on a current price per kilowatt-hour and current power flow exceeds a cost reduction monitoring threshold and in response to determining at 1008 that the anticipated duration of the peak pricing is less than the amount of time that a high-voltage ESS device can supply electrical power based on average power flows, the energy control system commands one or more switching device assemblies to selectively feed electrical power from the high-voltage ESS device.

At 1004, 1006, and 1008, in response to determining that the consumption costs associated with feeding electrical power from one or more utility power sources based on a current price per kilowatt-hour and current flow exceeds a cost reduction monitoring threshold and in response to determining at 1008 that the charge remaining in a high-voltage ESS device is not sufficient to provide electrical power to the loads based on current power flows, the energy control system does not command switching to high-voltage ESS power and continues to monitor the consumption costs at 1004.

In some embodiments, a primary or secondary power system may comprise multiple power legs. Each leg may include a connection to a power source, one or more switching device assemblies, a high-voltage ESS device, a transformer, and a power transmission line coupled to one or more data centers. The flow through each leg of a power system may be measured at the transformer in the substation that steps down the high-voltage electrical power into low-voltage power fed to a data center. The flow of power through a particular transformer may represent the power flowing through the particular leg. At 1004, 1012, and 1014, in response to determining that the consumption costs associated with feeding electrical power from one or more utility power sources based on a current price per kilowatt-hour and current flow does not exceeds a cost reduction monitoring threshold and in response to determining that a demand charge based on a current flow of power in kilowatts from the utility power source exceeds one or more cost reduction monitoring thresholds, the energy control system may determine the occurrence of a power event and in response to determining the occurrence of a power event, determine one or more legs of the primary power system to be fed from a high-voltage ESS device instead of being fed from the utility power source with associated costs that exceed the threshold demand charge. The energy control system may determine the leg of the primary or secondary power system with the lowest flow of power (i.e. lowest kilowatts) to determine which leg of the multiple legs of the primary power system to be fed from a high-voltage ESS device in order to reduce the costs associated with receiving electrical power from the utility power source.

At 1016, the energy control system determines if switching the leg with the lowest power flow to receive electrical power from a high-voltage ESS device would reduce the costs associated with the demand charge below the threshold. To do this, the energy control system determines the flow of electrical power through each leg of the system based on the flow measured at the transformers in the substation. The energy control system then subtracts the measured flow for a particular leg from the overall flow from the utility power source and recalculates the costs for the demand charge at this hypothetical lower flow. If the hypothetical lower flow would result in reducing the demand charge below the threshold, then the energy control system goes to 1022.

At 1018, in response to determining, that the hypothetical reduced power flow that would result from switching the leg with the lowest power flow to receive power from a high-voltage ESS device instead of from the utility power source would not reduce the demand charge below the threshold, the energy control system determines the leg with the next lowest flow (kilowatts).

At 1020, the energy control system determines if the sum of the lowest flowing legs (i.e. the leg determined at 1014 and the leg determined at 1018) would reduce the power flow such that the demand charge is below the threshold if the lowest flowing legs were switched to receive electrical power from high-voltage ESS devices instead of receiving electrical power from the utility power source. If the overall flow of power from the utility power source minus the sum of the lowest flowing legs would still result in the demand charge exceeding the threshold, the energy control system goes to 1018 and identifies the leg with the next lowest power flow (kilowatts) and repeats step 1020. If the overall flow of power from the utility power source minus the sum of the lowest flowing legs would result in the demand charge falling below the threshold, the energy control system goes to 1022.

At 1022, the energy control system determines if the high-voltage ESS devices in the determined legs that are to be switched to feed from high-voltage ESS devices have a sufficient power supply available. In order to determine if the high-voltage ESS devices have a sufficient power supply, the energy control system estimates the duration of the peak consumption that is causing the demand charge to exceed the threshold based on historical consumption data stored in the energy control system. The energy control system then uses information received from the high-voltage ESS devices to determine the charge remaining in respective high-voltage ESS devices. The energy control system calculates if the charge remaining in the respective ESS devices is greater than a charge required to provide electrical power feed at an anticipated flow based on historical flows. If the energy control system determines that a particular ESS device does not have sufficient charge to provide electrical power for the anticipated duration of the peak demand charge event, the energy control system does not command the power feed for that particular leg to be switched to feed from that particular high-voltage ESS device and continues to monitor pricing at 1004.

At 1024, in response to determining that a particular high-voltage ESS device has sufficient charge to provide electrical power for the anticipated duration of the peak demand charge event, the energy control system commands one or more switches to selectively feed electrical power to a particular leg from the high-voltage ESS device instead of from the utility power source. The particular leg can include one or more of the determined legs.

In some embodiments, the energy control system may discontinue feeding electrical power from a high-voltage ESS device in response to determining the remaining charge in a high-voltage ESS device is less than a minimum charge. The energy control system may command one or more switches to selectively feed electrical power from a utility power source even though the costs associated with feeding electrical power from the utility power source may exceed the consumption cost threshold, the demand charge threshold, or both.

At 1004, 1012, and 1026 in response to determining the consumption costs do not exceed a consumption cost threshold and in response to determining the demand charge costs do not exceed a demand charge cost threshold, the energy control system determines if a particular leg is currently switched to receive power from a utility power source. If the leg is currently receiving power from a utility power source, the energy control system goes back to 1004 and continues to monitor consumption costs.

At 1024, in response to determining at 1026 that the leg is not currently switched to receive power from the utility power source, the energy control system commands one or more switching device assemblies to selectively feed electrical power to the loads in the particular leg from the utility power source.

In some embodiments, the energy control system operates the processes described in FIGS. 8 and 9 in conjunction with the process described in FIG. 10. For example, if the cost monitoring determines that a particular leg should be switched to feed electrical power from the utility power source, but the waveform analysis of FIGS. 8 and 9 determine that the utility power source is unstable, the energy control system may not command the power feed be switched to the utility power source.

Figure 11:
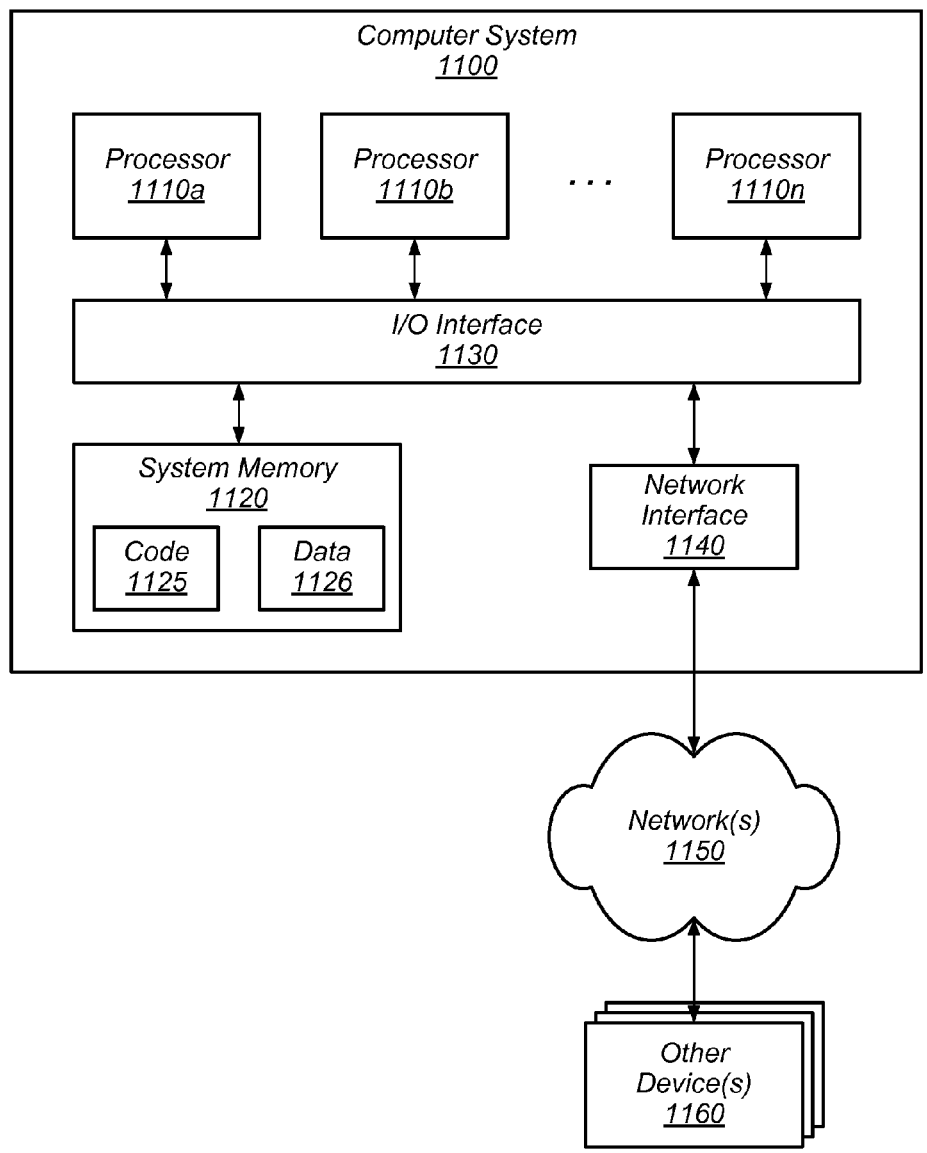
FIG. 11 is a block diagram illustrating an example computer system that may be used in some embodiments.

FIG. 11 is a block diagram illustrating an example computer system that may be used in some embodiments.

In some embodiments, a system that implements a portion or all of one or more of the technologies, including but not limited to a portion or all of the energy control system, systems and components associated with the energy control system, and various methods, systems, components, devices, and apparatuses as described herein, may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of one or more of the technologies, including but not limited to a portion or all of the energy control system, systems and components associated with the energy control system, and various methods, systems, components, devices, and apparatuses as described herein, are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIGS. 1 through 10, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data for implementing embodiments of methods as described above relative to FIGS. 1-10. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    a data center;
    an electrical substation configured to distribute low-voltage power to the data center from one or more high-voltage power sources, wherein the electrical substation comprises:
        a transformer configured to step down high-voltage power into low-voltage power supplied to the data center, and
        at least one switching device assembly configured to selectively route a high-voltage utility power feed to the transformer from one of a plurality of utility power sources or a high-voltage energy storage system (ESS) device, wherein:
            the high-voltage ESS device is configured to selectively store high-voltage power received from one or more utility power sources of the plurality of utility power sources via a power connection or to discharge the stored high-voltage power, as a high-voltage discharge power feed, via the same power connection; and
    an energy control system configured to command the at least one switching device assembly to selectively switch between routing, to the transformer, the high-voltage utility power feed from one of the plurality of utility power sources and routing, to the transformer, a separate high-voltage discharge power feed from the high-voltage ESS device, based at least in part upon a waveform monitoring determination or a cost reduction monitoring determination, wherein:
        the waveform monitoring determination comprises:
            identifying a waveform associated with the high-voltage utility power feed received from the one of the plurality of utility power sources, and
            determining that the identified waveform correlates with a waveform pattern indicating potential interruption of the high-voltage utility power feed; and
        the cost reduction monitoring determination comprises:
            determining that a cost associated with the high-voltage utility power feed received from the one of the plurality of utility power sources exceeds a threshold.

2. The system of claim 1, wherein the data center comprises:
    a primary power system configured to distribute electrical power from the high-voltage utility power feed, via the transformer stepping down the high-voltage utility power feed to a low-voltage power feed, to one or more loads in the data center via an automatic transfer switch coupled to the one or more loads; and
    a secondary power system configured to distribute electrical power from a separate high-voltage utility power feed, via a separate transformer stepping down the separate high-voltage utility power feed to a separate low-voltage power feed, to the one or more loads in the data center via the automatic transfer switch coupled to the one or more loads in the absence of power being received at the automatic transfer switch from the primary power system.

3. The system of claim 2, wherein the energy control system is further configured to:
command the automatic transfer switch to selectively switch between routing, to the one or more loads, the electrical power from the primary power system, and routing, to the one or more loads, the electrical power from the secondary power system based at least in part on:
　a determination that the primary power system is receiving low-voltage power via the high-voltage discharge from the high-voltage ESS device being routed to the transformer; and
　a determination that the secondary power system is receiving low-voltage power via a high-voltage power feed from one of the plurality of utility power sources being routed to a separate transformer.

4. The system of claim 2, wherein:
the secondary power system comprises:
　an uninterruptible power supply, configured to feed low-voltage power to the one or more loads via the automatic transfer switch in the absence of low-voltage power being fed from the separate transformer; and
　the primary power system does not include an uninterruptible power supply.

5. A system comprising:
a data center;
an energy storage system (ESS) device configured to store high-voltage power received from one or more utility power sources of a plurality of utility power sources and to discharge the stored high-voltage power; and
an electrical substation configured to distribute low-voltage power to the data center from the one or more utility power sources and the ESS device, wherein the electrical substation comprises:
　at least one switching device configured to selectively route a high-voltage power feed from a selected utility power source of the plurality of utility power sources or the ESS device; and
　a transformer configured to step down the high-voltage power feed received from the at least one switching device into a low-voltage power feed supplied to the data center.

6. The system of claim 5 comprising:
an energy control system configured to command the at least one switching device to selectively switch between routing, to the transformer, a high-voltage power feed from the selected utility power source and routing, to the transformer, a separate high-voltage power feed from the ESS device based at least in part upon:
　identifying a waveform associated with the high-voltage power received from the selected utility power source, and
　determining that the identified waveform correlates with a pattern indicating potential interruption of the high-voltage power feed from the selected utility power source.

7. The system of claim 5 comprising:
an energy control system configured to command the at least one switching device to selectively switch between routing, to the transformer, a high-voltage power feed from the selected utility power source and routing, to the transformer, a separate high-voltage power feed from the ESS device based at least in part upon:
　determining one or more costs associated with the selected utility power source exceed a threshold.

8. The system of claim 7, wherein determining one or more costs associated with the selected utility power source exceed a threshold comprises determining one or more of:
　a period of time during a day wherein the one or more costs associated with the selected utility power source are greater than other periods of the day; or
　a period of time during a year wherein the one or more costs associated with the selected utility power source are greater than other periods of the year.

9. The system of claim 7, wherein to command the at least one switching device to switch between the selected utility power source and the ESS device, based at least in part upon determining one or more costs associated with the selected utility power source exceed a threshold, the energy control system is configured to:
　determine the one or more costs based at least in part upon received electrical market data;
　wherein the one or more costs include a cost per kilowatt-hour of electricity and a cost associated with a flow of electricity in kilowatts; and
　wherein the received electrical market data includes periodically updated electrical market prices corresponding to the one or more costs.

10. The system of claim 9 further comprising:
a plurality of ESS devices;
a plurality of transformers, wherein separate ones of the plurality of transformers receive high-voltage electrical power and step down the high-voltage electrical power to feed low-voltage electrical power to respective separate sets of power distribution systems in the data center; and
a plurality of switching devices, wherein separate switching devices of the plurality of switching devices are configured to route respective high-voltage power feeds to respective separate transformers of the plurality of transformers from a selected utility power source of the plurality of utility power sources or from a selected ESS device of the plurality of ESS devices, wherein
　the energy control system is further configured to command a limited selection of switching devices of the plurality of switching devices to feed a limited selection of the plurality of transformers from separate ESS devices, wherein, to feed the limited selection of transformers, respective switching devices of the limited selection of switching devices selectively switch between routing, to a respective separate transformer of the limited selection of transformers, a high-voltage power feed from a selected one of the plurality of utility power sources and routing, to the respective separate transformer of the limited selection of transformers, a high-voltage power feed from a selected one of the plurality of ESS devices based at least in part upon:
　　determining that feeding the limited selection of the plurality of transformers from separate ESS devices will reduce the one or more costs below the threshold.

11. The system of claim 5, wherein the substation comprises:

a primary power system feed configured to feed high-voltage power to a transformer that feeds a primary power system that distributes electrical power, received from the transformer, to one or more loads in the data center via an automatic transfer switch coupled to the one or more loads; and a secondary power system feed configured to feed high-voltage power to a separate transformer that feeds a secondary power system that distributes electrical power, received from the separate transformer, to the one or more loads in the data center via the automatic transfer switch coupled to the one or more loads, wherein:

the at least one switching device assembly is configured to:

selectively electrically couple the ESS device to the primary power system feed and electrically isolate the ESS device from the secondary power system feed; or selectively electrically couple the ESS device to the secondary power system feed and electrically isolate the ESS device from the primary power system feed.

12. The system of claim 5, wherein the data center comprises:

a primary power system configured to distribute electrical power from a separate high-voltage power feed, via a separate transformer stepping down the separate high-voltage power feed to a separate low-voltage power feed, to one or more loads in the data center via an automatic transfer switch coupled to the one or more loads; and a secondary power system configured to distribute electrical power from the high-voltage power feed, via the transformer stepping down the high-voltage power feed to the low-voltage power feed, to the one or more loads in the data center, via the automatic transfer switch coupled to the one or more loads in the absence of power being received at the automatic transfer switch from the primary power system, wherein:

the low-voltage power feed distributed by the secondary power system comprises low-voltage power stepped down from high-voltage power received from one or more of the one or more utility power sources or the ESS device.

13. The system of claim 12, wherein:

the primary power system comprises:

an uninterruptible power supply, configured to feed low-voltage power to the automatic transfer switch in the absence of low-voltage power being fed from the separate low-voltage power feed; and the secondary power system does not include an uninterruptible power supply.

14. A method comprising:

performing, by at least one computing device:

determining an occurrence of a power event associated with a utility high-voltage power source feeding electrical power to a data center, based at least in part upon monitoring one or more parameters associated with the utility high-voltage power source, wherein the utility high-voltage power source feeds electrical power to the data center via a high-voltage power feed and a transformer which steps down the high-voltage power feed to a low-voltage power feed supplied to the data center; and directing at least one switching device to switch the high-voltage power feed from electrical power fed from the utility high-voltage power source to a high-voltage discharge from an energy storage system (ESS) device, in response to determining the occurrence, wherein:

the ESS is configured to selectively store high-voltage power received from the utility high-voltage power source and discharge the stored high-voltage power as the high-voltage discharge.

15. The method of claim 14 wherein said determining an occurrence of a power event, based on monitoring one or more parameters associated with the utility high-voltage power source, comprises:

identifying a waveform associated with the high-voltage power feed from the utility high-voltage power source, and determining the identified waveform correlates with a pattern indicating potential interruption of the high-voltage power feed.

16. The method of claim 15 wherein, a reserve power system provides backup power to one or more loads in the data center, independently of the low-voltage power feed supplied to the data center via the transformer;

the reserve power system comprises one or more electric generators electrically coupled to the reserve power system; and said directing at least one switching device further comprises:

determining that an amount of stored electrical power remaining in the ESS falls below a threshold;

directing a switchgear to feed electrical power to the data center from the one or more electric generators via the reserve power system in response to determining the amount of stored electrical power remaining in the ESS falls below the threshold; and directing the at least one switching device to isolate the high-voltage discharge of the ESS from the one or more loads and to isolate the high-voltage discharge from the reserve power system in response to the switchgear switching to feed electrical power to the data center from the one or more electric generators.

17. The method of claim 14 wherein said determining an occurrence of a power event is based at least in part upon:

determining a cost associated with the utility high-voltage power source exceeds a threshold.

18. The method of claim 17, wherein determining a cost associated with the utility high-voltage power source exceeds a threshold comprises determining one or more of:

a period of time during a day wherein the cost associated with the utility high-voltage power source is greater than other periods of the day; or a period of time during a year wherein the cost associated with the plurality of utility high-voltage power source is greater than other periods of the year.

19. The method of claim 17 further comprising:

a plurality of ESS devices;

a plurality of transformers, wherein separate ones of the plurality of transformers receive high-voltage electrical power and step down high-voltage electrical power to feed low-voltage electrical power to respective separate sets of power distribution systems in the data center; and a plurality of switching devices, wherein separate switching devices of the plurality of switching devices are configured to route respective high-voltage power feeds to respective separate transformers of the plurality of transformers from a selected utility power source of the plurality of utility power sources or from a selected one of the plurality of ESS devices, wherein said directing the at least one switching device further comprises:

commanding a limited selection of switching devices of the plurality of switching devices to feed a limited selection of the plurality of transformers from separate ESS devices, wherein to feed the limited selection of transformers, respective switching devices of the limited selection of switching devices selectively switch between routing, to a respective separate transformer of the limited selection of transformers, a feed from the utility high-voltage power source and routing, to the respective separate transformer of the limited selection of transformers, a feed from separate respective ones of the plurality of ESS devices based at least in part upon:

determining that feeding the limited selection of the plurality of transformers from separate ESS devices will reduce the cost associated with the high-voltage power source below the threshold.

20. The method of claim 14, wherein said directing at least one switching device to switch the high-voltage power feed between the utility high-voltage power source and a high-voltage discharge from the ESS device comprises:

directing a switching device electrically coupling the ESS device to the high voltage power feed to open, such that the high voltage power feed is precluded from receiving the high-voltage discharge from the ESS device, and directing another switching device to close to electrically couple the ESS device to a secondary power system, such that the secondary power system is configured to provide electrical power from the ESS device to the data center independent of the high-voltage power feed.

* * * * *